(12) United States Patent
Tsusaka et al.

(10) Patent No.: US 9,844,481 B2
(45) Date of Patent: Dec. 19, 2017

(54) STANDING/SITTING MOTION ASSIST SYSTEM, STANDING/SITTING MOTION ASSIST METHOD, STANDING/SITTING MOTION ASSIST ROBOT, AND NON-TRANSITORY COMPUTER-READABLE RECORDING MEDIUM

(71) Applicant: Panasonic Intellectual Property Management Co., Ltd., Osaka (JP)

(72) Inventors: Yuko Tsusaka, Osaka (JP); Yudai Fudaba, Osaka (JP); Yasunao Okazaki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 56 days.

(21) Appl. No.: 15/184,994

(22) Filed: Jun. 16, 2016

(65) Prior Publication Data

US 2017/0014290 A1 Jan. 19, 2017

(30) Foreign Application Priority Data

Jul. 13, 2015 (JP) ................................. 2015-139764
Mar. 30, 2016 (JP) ................................. 2016-069018

(51) Int. Cl.
*A61G 7/10* (2006.01)
*B25J 13/08* (2006.01)
(Continued)

(52) U.S. Cl.
CPC .............. *A61G 7/10* (2013.01); *A61G 7/1017* (2013.01); *B25J 5/007* (2013.01); *B25J 9/046* (2013.01);
(Continued)

(58) Field of Classification Search
CPC ....... A61G 7/10; A61G 7/1017; B25J 9/1633; B25J 5/007; B25J 9/046; B25J 13/085; B25J 11/009; G05B 2219/45108
See application file for complete search history.

(56) References Cited

U.S. PATENT DOCUMENTS 6,742,206 B1 * 6/2004 Han ........................ A61G 5/006
280/250.1
7,392,554 B1 * 7/2008 Su ......................... A61G 7/1017
5/86.1
(Continued)

FOREIGN PATENT DOCUMENTS

JP 2010-142562 7/2010
JP 2010-167076 8/2010
JP 2013-158386 8/2013

*Primary Examiner* — Jason Holloway
(74) *Attorney, Agent, or Firm* — Wenderoth, Lind & Ponack, L.L.P.

(57) ABSTRACT

A holding mechanism holds a care-receiver, a traction mechanism that is connected to the holding mechanism, and the traction mechanism pulls the holding mechanism so that the holding mechanism draws a predetermined path. On the basis of a position of the holding mechanism detected by a position sensor and a force detected by a force sensor, if the position of the holding mechanism is not on the predetermined path, a controller controls the traction mechanism so that the holding mechanism draws the predetermined path by changing the position of the holding mechanism to a position on the predetermined path at a time after the time at which the position is detected.

15 Claims, 22 Drawing Sheets

(51) Int. Cl.
*B25J 11/00* (2006.01)
*B25J 5/00* (2006.01)
*B25J 9/04* (2006.01)
*B25J 9/16* (2006.01)

(52) U.S. Cl.
CPC ........... *B25J 9/1633* (2013.01); *B25J 11/009* (2013.01); *B25J 13/085* (2013.01); *G05B 2219/45108* (2013.01)

(56) References Cited

U.S. PATENT DOCUMENTS

| | | | | |
|---|---|---|---|---|
| 7,827,630 | B2* | 11/2010 | Bostelman | A61G 7/1007 5/83.1 |
| 8,621,684 | B2* | 1/2014 | Okumatsu | A61G 7/1017 5/81.1 R |
| 9,038,212 | B2* | 5/2015 | Yamaguchi | A61G 7/1017 5/87.1 |
| 9,452,528 | B1* | 9/2016 | Checka | B25J 9/1612 |
| 9,669,549 | B2* | 6/2017 | Suzuki | A61G 7/1017 |
| 2008/0265821 | A1* | 10/2008 | Theobald | B25J 5/005 318/568.12 |
| 2011/0277235 | A1* | 11/2011 | Okumatsu | A61G 7/1017 5/83.1 |

* cited by examiner

FIG. 6

| TIME (msec) | POSITION (m) | FORCE (N) | CONTROL FLAG (x, z) | INITIAL POSITION FLAG | CONTROL PARAMETER (ax, az) | PROGRESS INFORMATION |
|---|---|---|---|---|---|---|
| t0 | p0 | f0 | (0, 0) | 0 | (adx0, aux0, adz0, auz0) | 0 |
| t1 | p1 | f1 | (0, 0) | 1 | (adx1, aux1, adz1, auz1) | 1 |
| t2 | p2 | f2 | (0, 0) | 0 | (adx2, aux2, adz2, auz2) | 0 |
| : | : | : | : | : | : | : |
| tn | p10 | f10 | (0, 1) | 0 | (adx10, aux10, adz10, auz10) | 0 |
| tn+1 | p11 | f11 | (0, 1) | 0 | (adx11, aux11, adz11, auz11) | 0 |
| . . . . | . . . . | . . . . | . . . . | . . . . | . . . . | . . . . |

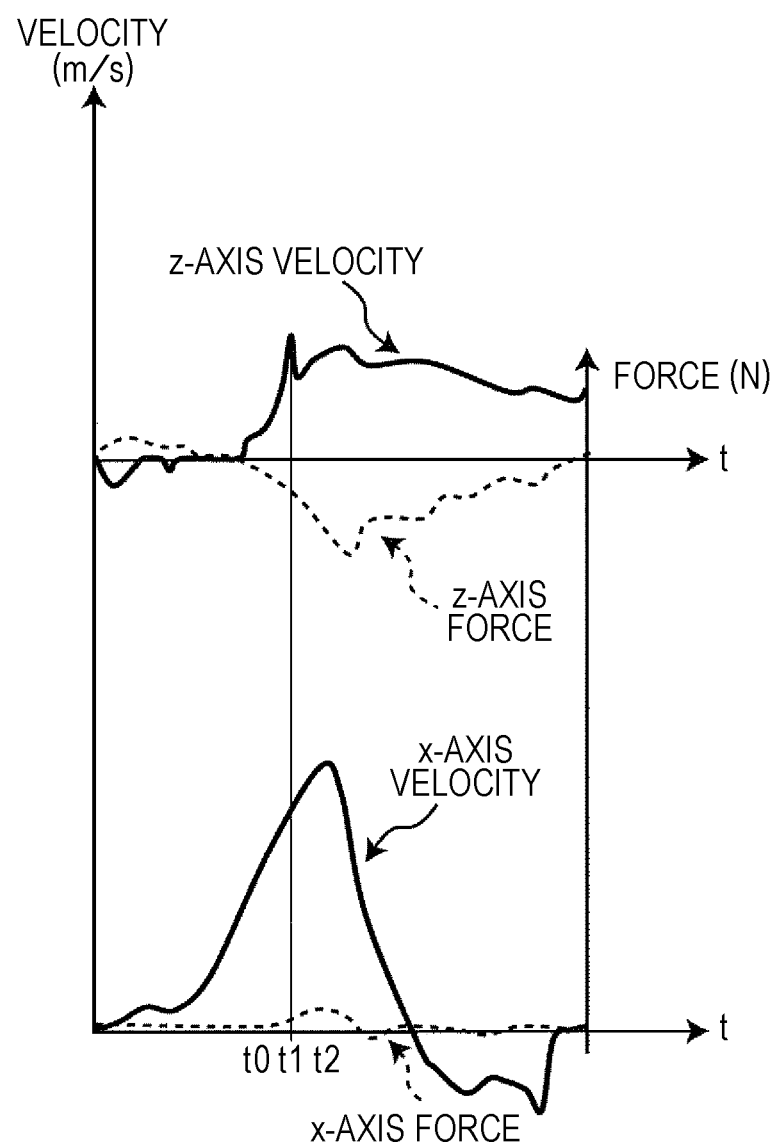

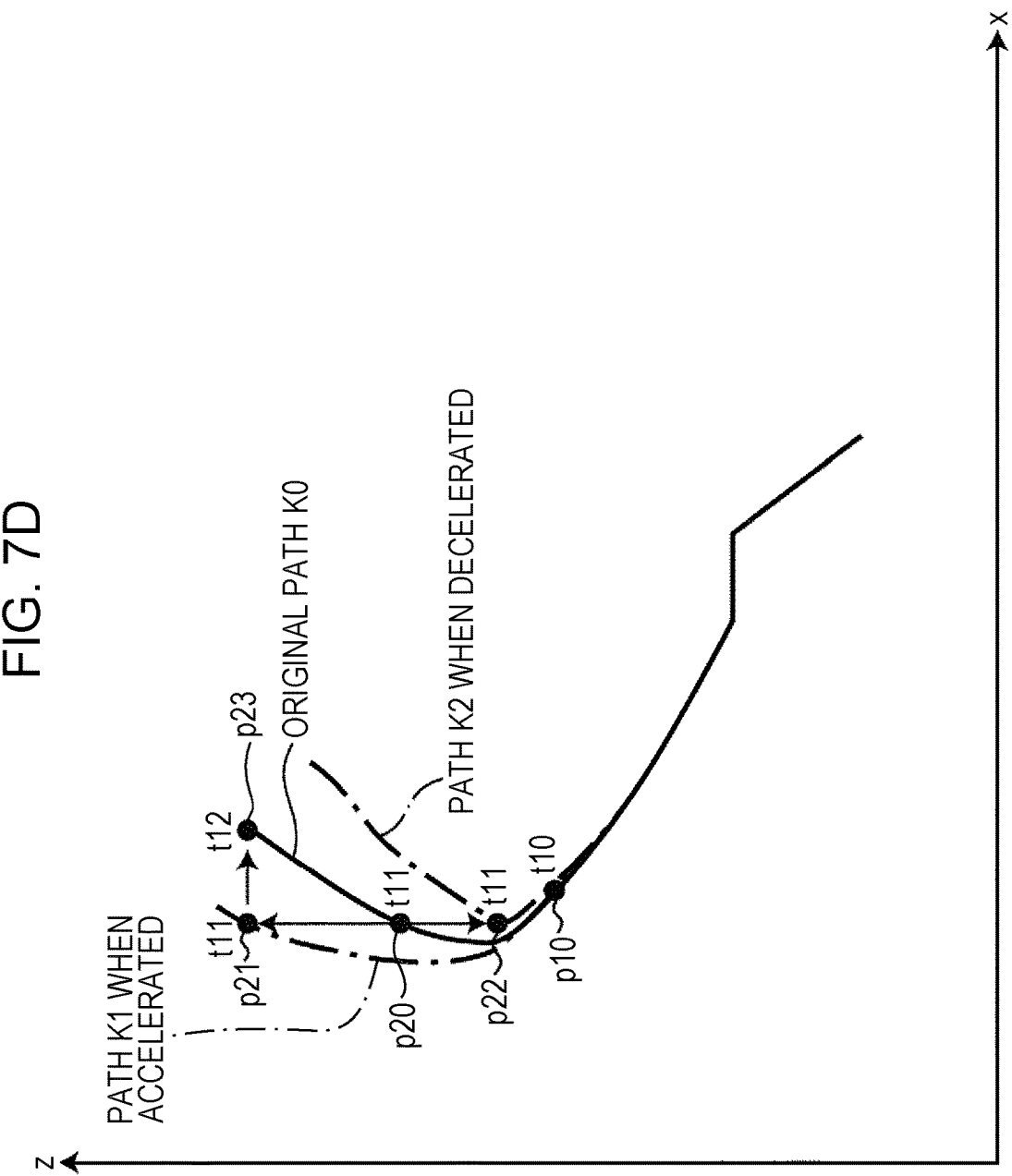

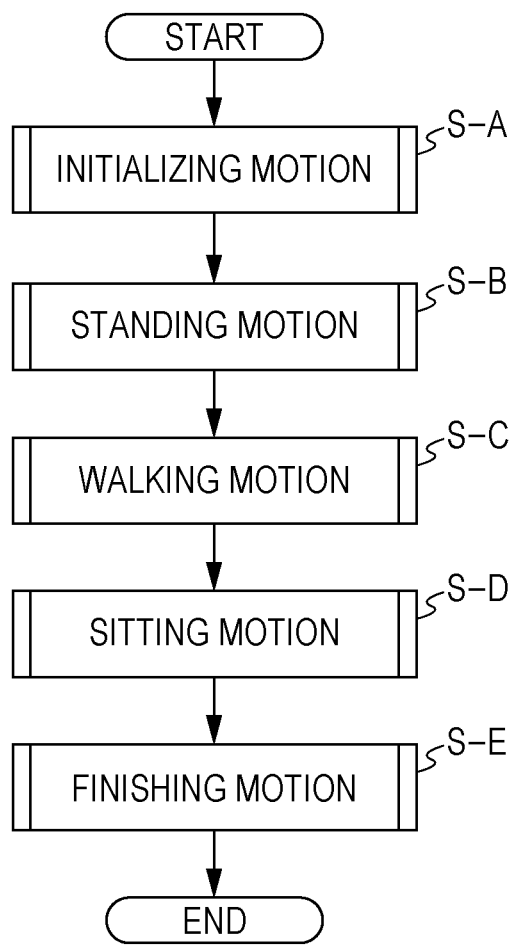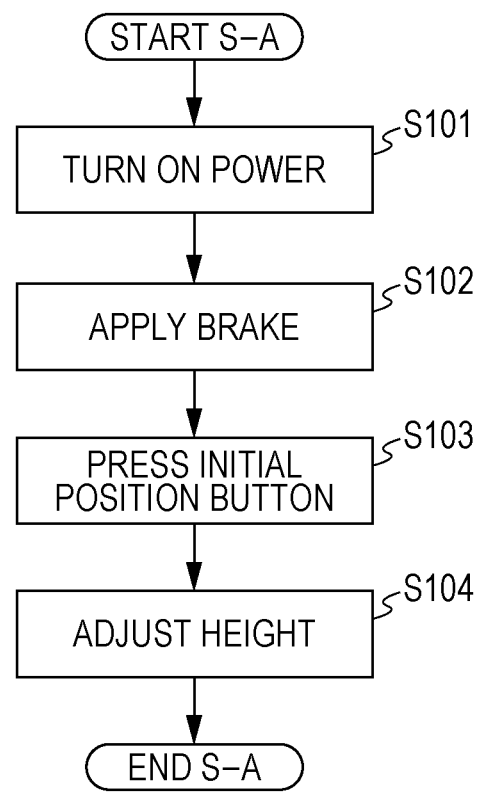

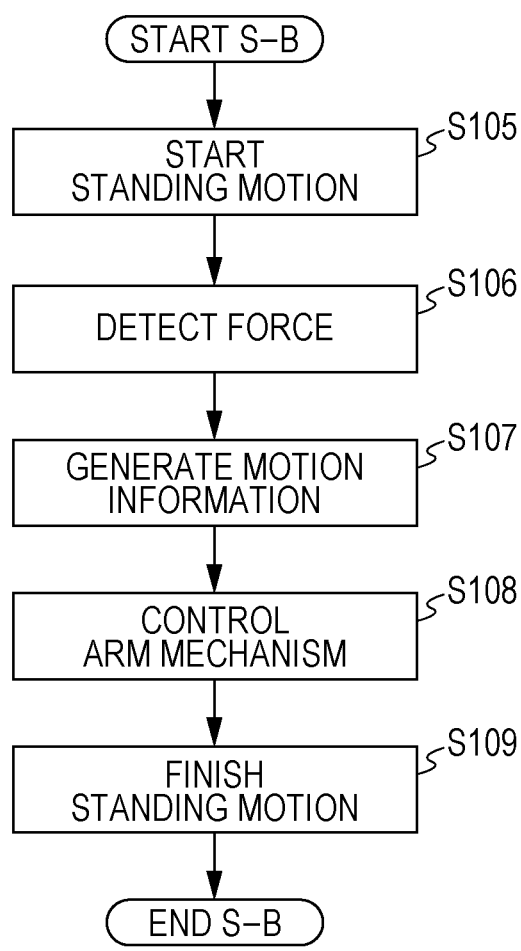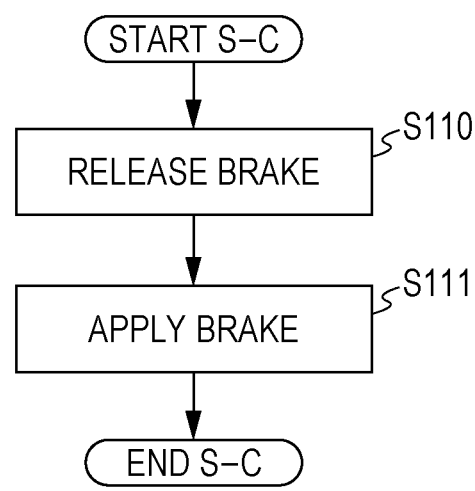

STANDING/SITTING MOTION ASSIST SYSTEM, STANDING/SITTING MOTION ASSIST METHOD, STANDING/SITTING MOTION ASSIST ROBOT, AND NON-TRANSITORY COMPUTER-READABLE RECORDING MEDIUM

BACKGROUND

1. Technical Field

The present disclosure relates to a standing/sitting motion assist system and a standing/sitting motion assist method for assisting a care-receiver in performing a standing/sitting motion, a robot including a robot controller for assisting a care-receiver in performing a standing/sitting motion, and a non-transitory computer-readable recording medium storing a standing/sitting motion assist program for assisting a care-receiver in performing a standing/sitting motion.

2. Description of the Related Art

Standing motion assist robots have been proposed that assist a care-receiver in performing a standing motion in accordance with preset path data while an operator is pressing an operation switch (see, for example, Japanese Unexamined Patent Application Publication No. 2013-158386). By supporting the chest of a care-receiver with a supporter and controlling three servo motors, in an automatic mode, the supporter is automatically driven along a predetermined path, and, in a manual mode, it is possible to change the speed and direction of the motion of the supporter by rotating a dial of a manual pulse generator in accordance with a motion of the care-receiver.

When such a standing motion assist robot is assisting a care-receiver in performing a specific motion, if the care-receiver performs a motion with his/her own power, the supporter may deviate from a path that is appropriate for the specific motion. For example, in a case where the standing motion assist robot assists a care-receiver in performing a standing motion, if the care-receiver tries to stand up with his/her own power while being assisted by the standing motion assist robot, a traction mechanism is pulled by the care-receiver and fails to keep on a path that is appropriate for the standing motion. Then, the traction mechanism performs a motion that is not intended by the care-receiver, and the care-receiver feels an unpleasant sensation. Likewise, when the assist robot assists a care-receiver in performing a sitting motion from a standing position, if the traction mechanism performs a motion that is not intended by the care-receiver, the care-receiver feels an unpleasant sensation.

SUMMARY

One non-limiting and exemplary embodiment of the present disclosure provides a standing/sitting motion assist system, a standing/sitting motion assist control method, a standing/sitting motion assist robot, and a non-transitory computer-readable recording medium storing a standing/sitting motion assist program that are capable of preventing a traction mechanism from performing a motion unintended by a care-receiver when assisting the care-receiver in performing a standing motion from a sitting position and in performing a sitting motion from a standing position and that are capable of preventing the care-receiver from feeling an unpleasant sensation.

In one general aspect, the techniques disclosed here feature a robot system including a holding mechanism that holds a care-receiver, a traction mechanism that is connected to the holding mechanism and that pulls the holding mechanism so that the holding mechanism draws a path that is convexly curved in a forward direction from the care-receiver by causing the holding mechanism to pass a first position at a first time and a second position at a second time, a position sensor that measures a third position of the holding mechanism at a third time between the first time and the second time, a force sensor that measures a first force that is applied to the traction mechanism via the holding mechanism at the third time, and a controller that controls the traction mechanism so that the holding mechanism draws the path by changing the third position to a position on the path at a time after the third time on the basis of the third position and the first force.

It should be noted that general or specific embodiments may be implemented as a system, a method, an integrated circuit, a computer program, a storage medium, or any selective combination thereof.

With the aspect of the present disclosure, it is possible to provide a standing/sitting motion assist system, a standing/sitting motion assist method, a standing/sitting motion assist robot, and a standing/sitting motion assist program that are capable of preventing a traction mechanism from performing a motion that is not intended by a care-receiver when assisting the care-receiver in performing a standing motion from a sitting position or when assisting the care-receiver in performing a sitting motion from a standing position and that are capable of preventing the care-receiver from feeling an unpleasant sensation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a table showing the details of a motion information database according to the first embodiment of the present disclosure;

FIG. 7A is graph of motion information according to the first embodiment of the present disclosure;

FIG. 7D is graph of motion information according to the first embodiment of the present disclosure;

FIG. 11A is a flowchart of a controller according to the first embodiment of the present disclosure;

FIG. 11B is a flowchart of an initializing motion controlled by the controller according to the first embodiment of the present disclosure;

FIG. 11C is a flowchart of a standing motion controlled by the controller according to the first embodiment of the present disclosure;

FIG. 11D is a flowchart of a walking motion controlled by the controller according to the first embodiment of the present disclosure;

DETAILED DESCRIPTION

Figure 1A:
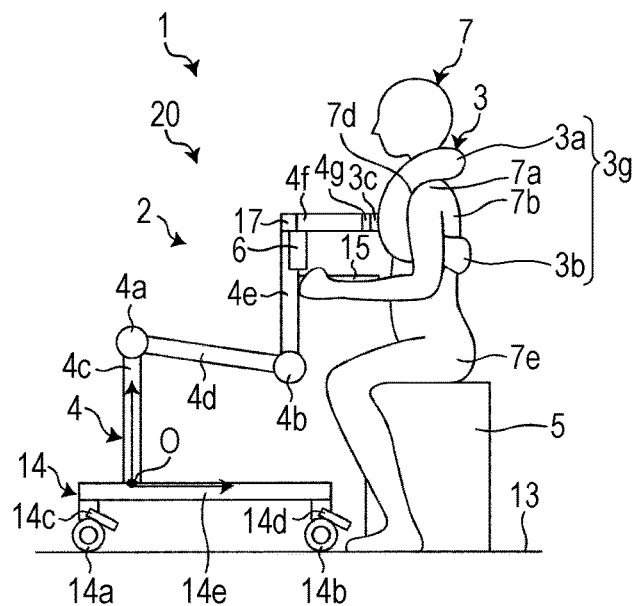
FIG. 1A is a schematic side view illustrating a care-receiver and a robot system that is an example of a standing/sitting motion assist system (for example, a standing/sitting motion assist apparatus) according to a first embodiment of the present disclosure.

Hereinafter, embodiments of the present disclosure will be described with reference to the drawings.

Before describing the embodiments of the present disclosure with reference to the drawings, various aspects of the present disclosure will be described.

A first aspect of the present disclosure provides a robot system including
  a holding mechanism that holds a care-receiver,
  a traction mechanism that is connected to the holding mechanism and that pulls the holding mechanism so that the holding mechanism draws a path that is convexly curved in a forward direction from the care-receiver by causing the holding mechanism to pass a first position at a first time and a second position at a second time,
  a position sensor that measures a third position of the holding mechanism at a third time between the first time and the second time,
  a force sensor that measures a first force that is applied to the traction mechanism via the holding mechanism at the third time, and
  a controller that controls the traction mechanism so that the holding mechanism draws the path by changing the third position to a position on the path at a time after the third time on the basis of the third position and the first force.

With the first aspect, when assisting a care-receiver in performing a standing motion from a sitting position or when assisting the care-receiver in performing a sitting motion from a standing position, the traction mechanism does not perform a motion that is not intended by the care-receiver. Therefore, it is possible to prevent the care-receiver from feeling an unpleasant sensation.

That is, it is required that a robot system for assisting a care-receiver in performing a specific motion should assist the care-receiver in performing a motion along a path that is appropriate for performing the specific motion while the robot system is holding the care-receiver with the holding mechanism.

However, when the robot system is assisting a care-receiver in performing a specific motion, if the care-receiver performs a motion with his/her own power, the path may deviate from the path that is appropriate for the specific motion. For example, in a case where the robot system assists a care-receiver in performing a standing motion or a sitting motion, if the care-receiver tries to stand up or sit down with his/her own power while being assisted by the robot system, a traction mechanism is pulled by the care-receiver and fails to keep on a path that is appropriate for the standing motion or the sitting motion. Then, the care-receiver is prevented from performing an intended action and feels an unpleasant sensation.

With the present aspect, the holding mechanism can keep on the path by changing the third position to a position on the path at a time after the third time on the basis of the third position and the first force. Thus, for example, even when the care-receiver pulls the traction mechanism in trying to stand up or sit down with his/her own power, the path of the holding mechanism pulled by the traction mechanism does not change. Accordingly, the care-receiver is not prevented from performing an intended action and does not feel an unpleasant sensation.

A second aspect of the present disclosure provides the robot system according to the first aspect, further including an operation device that receives an operation input to the traction mechanism,
  wherein the controller controls the traction mechanism so that the holding mechanism draws the predetermined path while the operation device continues receiving the operation input.

With the second aspect, the traction mechanism moves while a care-receiver or a caregiver continues inputting an operation input by using the operation device. Thus, the safety of the care-receiver is increased, because the traction mechanism does not move unless the care-receiver or the caregiver performs the operation input.

A third aspect of the present disclosure provides the robot system according to the second aspect,
  wherein, on the basis of a correspondence table including correspondence between a traction velocity and a position and on the basis of a position at a time at which the operation input is received, the controller causes a velocity with which the traction mechanism pulls the holding mechanism for a predetermined time from the time at which the operation input is received to be lower than a velocity stored in the correspondence table.

With the third aspect, the traction mechanism pulls the holding mechanism slowly for the predetermined time after started pulling. Thus, the safety of the care-receiver is increased, because the care-receiver is prevented from being pulled quickly immediately after pulling is started.

A fourth aspect of the present disclosure provides the robot system according to any one of the first to third aspects, wherein the path is a path along which the care-receiver stands up and the care-receiver sits down.

A fifth aspect of the present disclosure provides the robot system according to any one of the first to fourth aspects,
  wherein the traction mechanism includes an arm mechanism and a plurality of wheels, the arm mechanism including a plurality of joints, the wheels being disposed on a lower part of the arm mechanism.

A sixth aspect of the present disclosure provides a holding mechanism used for the robot system according to any one of the first to fifth aspects, the holding mechanism including
  a first holder that holds a neck or a back of the care-receiver,
  a second holder that holds a waist of the care-receiver, and
  a connector that is placed on a chest of the care-receiver and that connects the first holder and the second holder to each other on a front side of the care-receiver,
  wherein the holding mechanism is attachable to and removable from the traction mechanism via the connector.

A seventh aspect of the present disclosure provides a non-transitory computer-readable recording medium storing a program that is executed by a computer of a robot system including
  a holding mechanism that holds a care-receiver,
  a traction mechanism that is connected to the holding mechanism and that pulls the holding mechanism so that the holding mechanism draws a path that is convexly curved in a forward direction from the care-receiver by causing the holding mechanism to pass a first position at a first time and a second position at a second time,
  a position sensor that measures a third position of the holding mechanism at a third time between the first time and the second time, and
  a force sensor that measures a first force that is applied to the traction mechanism via the holding mechanism at the third time,
  the program causing the computer to execute
  obtaining the third position of the holding mechanism at the third time by using the position sensor,
  obtaining the first force at the third time by using the force sensor, and
  controlling, by using a controller, the traction mechanism so that the holding mechanism draws the path that is convexly curved in the forward direction from the care-receiver by changing the third position to a position on the path at a time after the third time on the basis of the obtained third position and the obtained first force.

An eighth aspect of the present disclosure provides a method of controlling a robot system including
  a holding mechanism that holds a care-receiver,
  a traction mechanism that is connected to the holding mechanism and that pulls the holding mechanism so that the holding mechanism draws a path by causing the holding mechanism to pass a first position at a first time and a second position at a second time,
  a position sensor that measures a third position of the holding mechanism at a third time between the first time and the second time, and
  a force sensor that measures a first force that is applied to the traction mechanism via the holding mechanism at the third time,
  the method including
  measuring the third position of the holding mechanism at the third time by using the position sensor,
  measuring the first force at the third time by using the force sensor, and
  controlling, by using a controller, the traction mechanism so that the holding mechanism draws the path by changing the third position to a position on the path at a time after the third time on the basis of the obtained third position and the obtained first force.

Underlying Knowledge Forming Basis of the Present Disclosure

When a care-receiver is assisted by a robot system in performing a standing motion from a sitting position or in performing a sitting motion from a standing position, if the care-receiver performs a motion with his/her own power, the path may deviate from a path that is appropriate for the standing motion or the sitting motion. For example, in a case where the robot system assists a care-receiver in performing a standing motion, if the care-receiver tries to stand up with his/her own power while being assisted by the robot system, a traction mechanism is pulled by the care-receiver and fails to keep on a path that is appropriate for the standing motion. That is, because the robot system tries to keep the traction mechanism on a path that is appropriate for the standing motion, the care-receiver is prevented from performing an intended action by the traction mechanism and feels an unpleasant sensation.

The inventor found that the care-receiver can be prevented from feeling an unpleasant sensation by returning the path of the traction mechanism that pulls the care-receiver to a path that is stored in the robot system for assisting a corresponding motion at a different time. By returning the path of the traction mechanism to a path stored in the robot system, the traction mechanism can keep on the path, and the care-receiver is not prevented from performing an intended action by the traction mechanism and does not feel an unpleasant sensation.

Hereinafter, a standing motion assist system and the like according to embodiments of the present disclosure will be described in detail.

First Embodiment

Figure 1B:
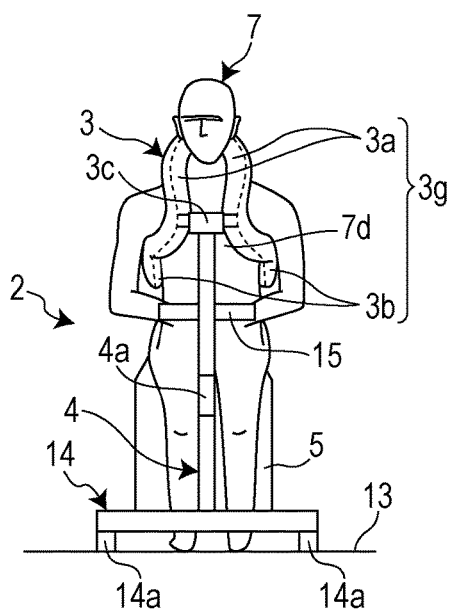
FIG. 1B is a schematic front view illustrating the care-receiver and the robot system according to the first embodiment of the present disclosure when the care-receiver is in a sitting position.
Figure 1C:
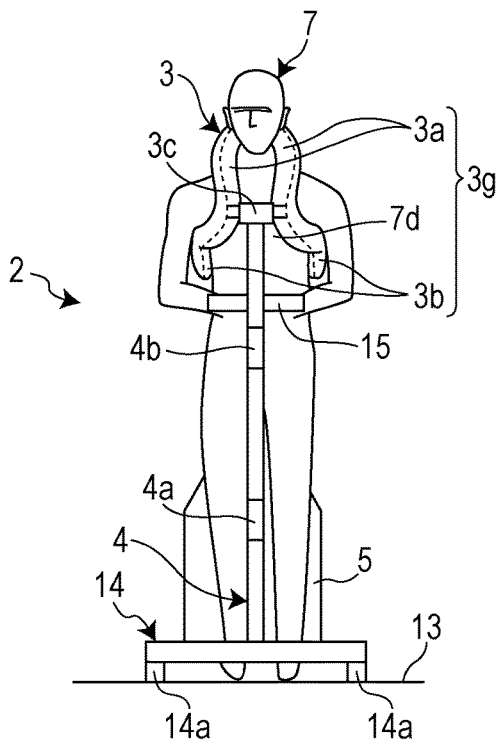
FIG. 1C is a schematic front view illustrating the care-receiver and the robot system according to the first embodiment of the present disclosure when the care-receiver is in a standing position.
Figure 2:
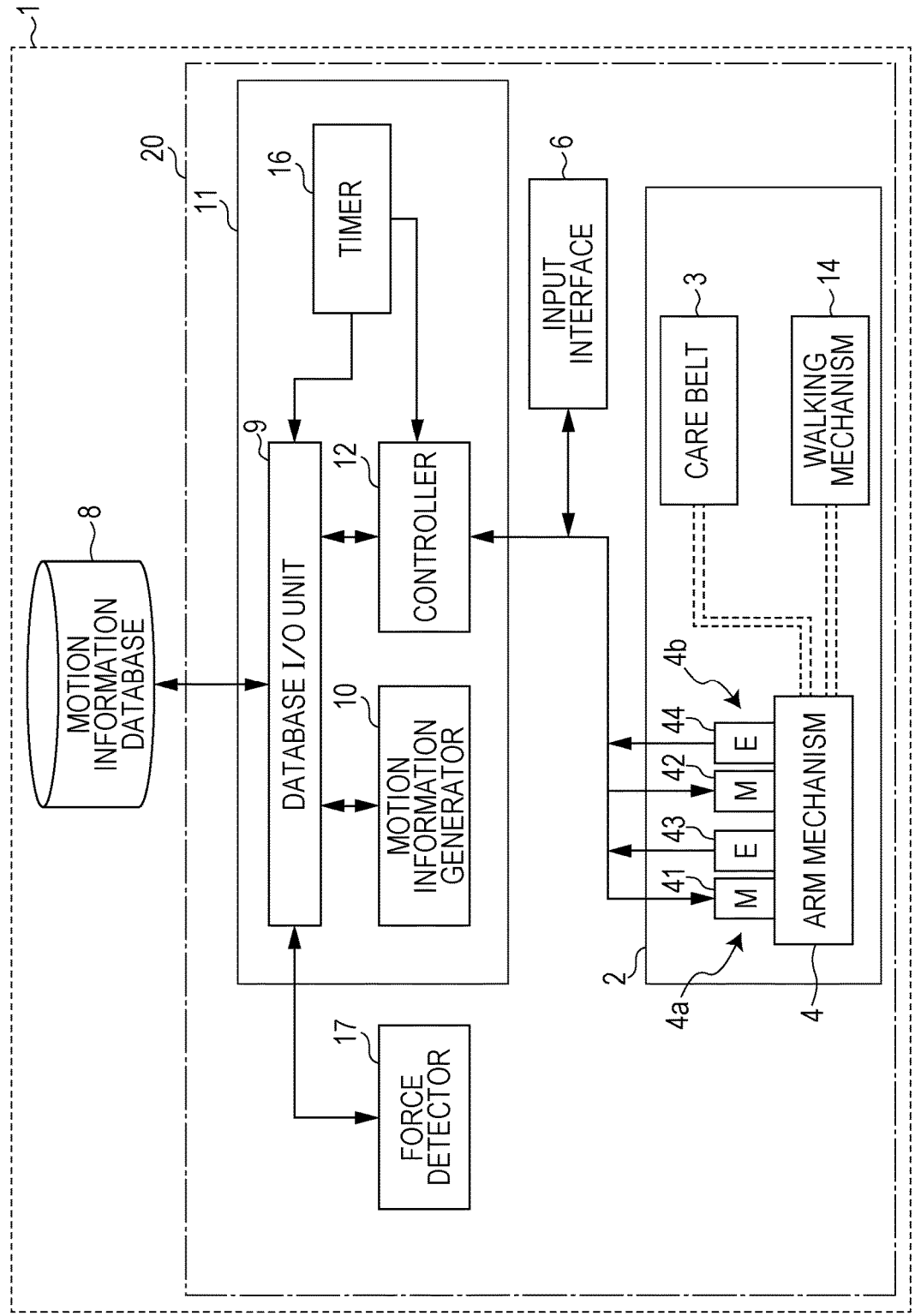
FIG. 2 is a block diagram of the robot system according to the first embodiment of the present disclosure.
Figure 3A:
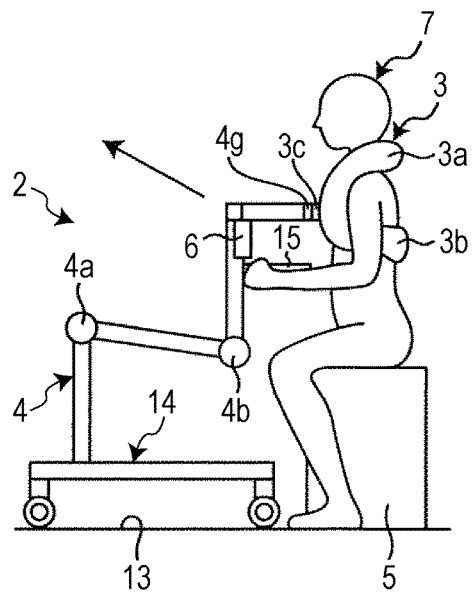
FIG. 3A is a schematic view illustrating a standing motion of the robot system according to the first embodiment of the present disclosure.
Figure 3B:
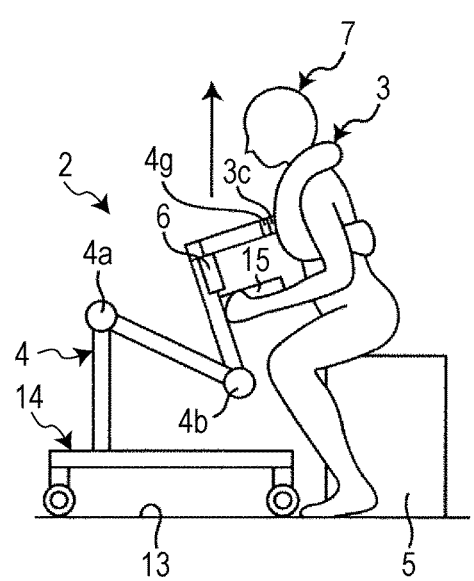
FIG. 3B is a schematic view illustrating a standing motion of the robot system according to the first embodiment of the present disclosure.
Figure 3C:
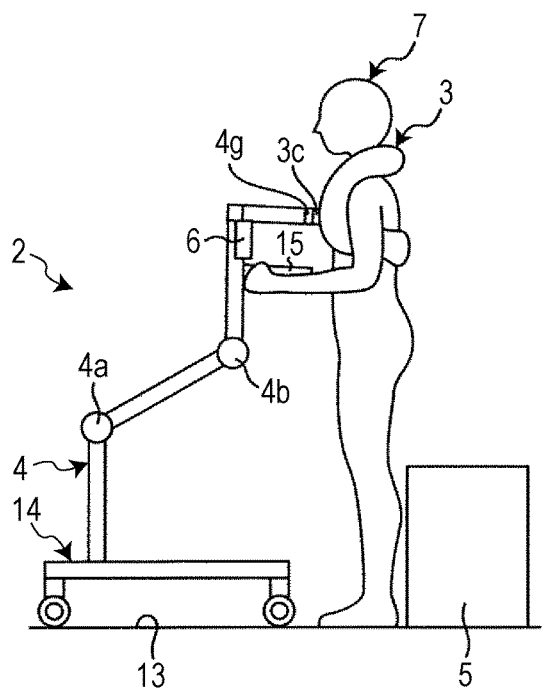
FIG. 3C is a schematic view illustrating a standing motion of the robot system according to the first embodiment of the present disclosure.
Figure 4A:
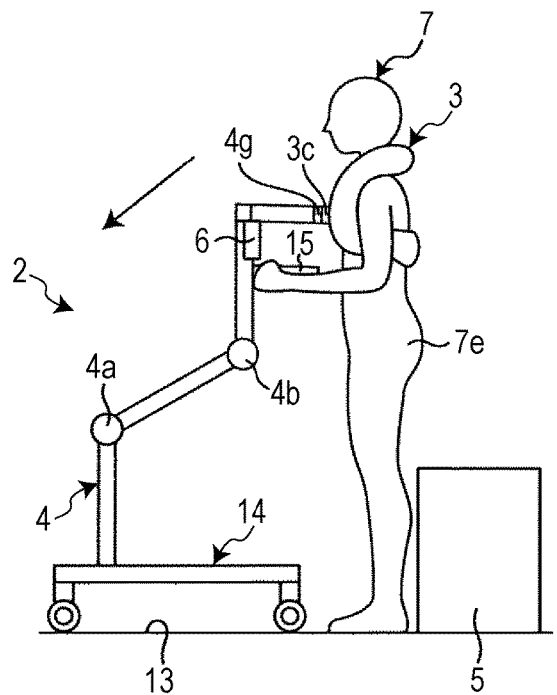
FIG. 4A is a schematic view illustrating a sitting motion of the robot system according to the first embodiment of the present disclosure.
Figure 4B:
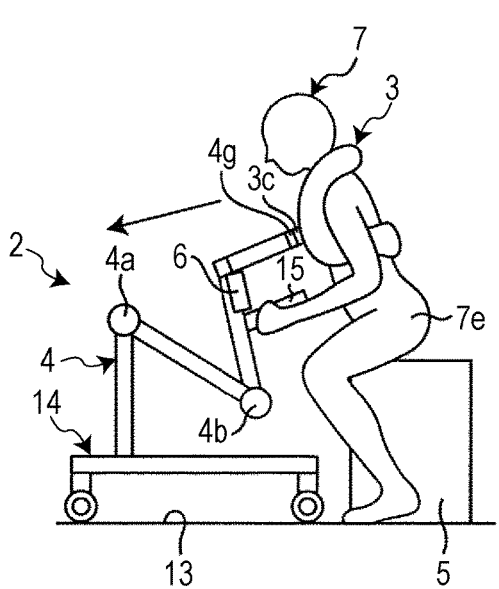
FIG. 4B is a schematic view illustrating a sitting motion of the robot system according to the first embodiment of the present disclosure.
Figure 4C:
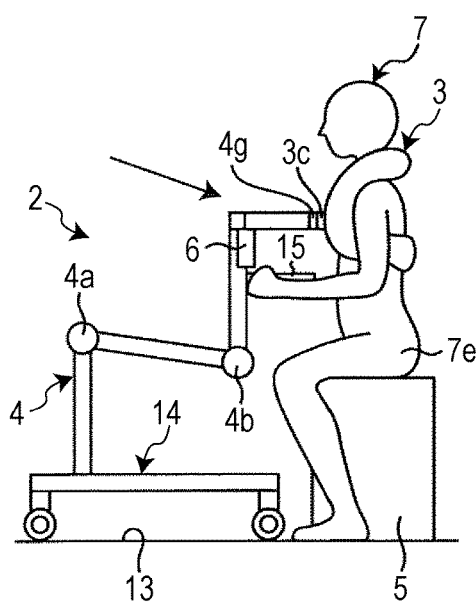
FIG. 4C is a schematic view illustrating a sitting motion of the robot system according to the first embodiment of the present disclosure.

FIGS. 1A and 1B illustrate an example of a motion assist system (such as a standing/sitting motion assist apparatus) according to a first embodiment of the present disclosure. FIGS. 1A and 1B illustrate a robot system 1, which is an example of the motion assist system. FIGS. 1A and 1B are respectively a side view and a front view illustrating a robot 20 when a care-receiver 7 is in a sitting position. The robot 20 assists the care-receiver 7 in performing a standing motion from a sitting position to a standing position and a sitting motion from a standing position to a sitting position. The care-receiver 7 is sitting on a seat 5 on a floor 13 (that is, in a sitting position.) FIG. 1C is a front view of the robot system 1 when the care-receiver 7 is in a standing position. FIG. 2 is a block diagram of the robot system 1 according to the first embodiment. FIGS. 3A to 3C are schematic views illustrating an example of a first driving pattern of a standing motion (an example of a first motion) of the robot system 1 according to the first embodiment of the present disclosure. FIGS. 4A to 4C are schematic views illustrating an example of a second driving pattern of a sitting motion (an example of a second motion) of the robot system 1 according to the first embodiment of the present disclosure.

The robot system 1 illustrated in FIGS. 1A to 2 is an example of a standing motion assist system that assists a standing motion of the care-receiver 7. The robot system 1 includes the robot 20. As illustrated in FIG. 2, the robot system 1 includes a motion information database 8 and a motion state database, which are located outside the robot 20. Alternatively, the robot 20 may include the motion information database 8 and the motion state database. The term "care-receiver 7" refers to a user who is assisted by the motion assist system.

The robot 20 is placed on the floor 13 and includes a body mechanism 2; a control device 11; an input interface 6; and a force detector 17, which is a force sensor.

The body mechanism 2 includes an arm mechanism 4; a care belt 3, which is an example of a holding mechanism; and a walking mechanism 14. The body mechanism 2 need not include the walking mechanism 14. The arm mechanism 4 at least includes a robot arm, which is an example of a traction mechanism.

The control device 11 includes a database I/O unit 9, a motion information generator 10, a timer 16, and a controller 12.

Care Belt 3

Referring to FIGS. 1A to 1C, the care belt 3 can be put on the care-receiver 7 and holds the care-receiver 7. The care belt 3 includes a first holder 3a, a second holder 3b, and a connector 3c. The care belt 3 is attachable to and removable from the robot arm via the connector 3c.

A holder unit 3g at least includes the first holder 3a and the second holder 3b.

The first holder 3a can hold either or both of a neck portion 7a and a back portion 7b of the care-receiver 7.

When the holder unit 3g is put on the care-receiver 7, the connector 3c can be positioned on a chest 7d of the care-receiver 7 and connects the first holder 3a and the second holder 3b to each other on the front side of the care-receiver 7. The connector 3c, which is connected to the holder unit 3g, is connectable to and disconnectable from an end (for example, a back end) of the arm mechanism 4 as described below.

Referring to FIGS. 1A to 1C, the connector 3c is connected to, for example, the end of the arm mechanism 4. The connector 3c is located at a position that is near the center of the chest of the care-receiver 7 and near the boundary between the first holder 3a and the second holder 3b. The connector 3c extends in a region between end portions of the first holder 3a and end portions of the second holder 3b, which are connected to each other. The connector 3c is connected to the end of the arm mechanism 4 by using a screw. However, the connector 3c may be connected to the end of the arm mechanism 4 by using any appropriate known method. A connection mechanism 60, which is an example of a mechanism for implementing such a method, will be described below.

Figure 12:
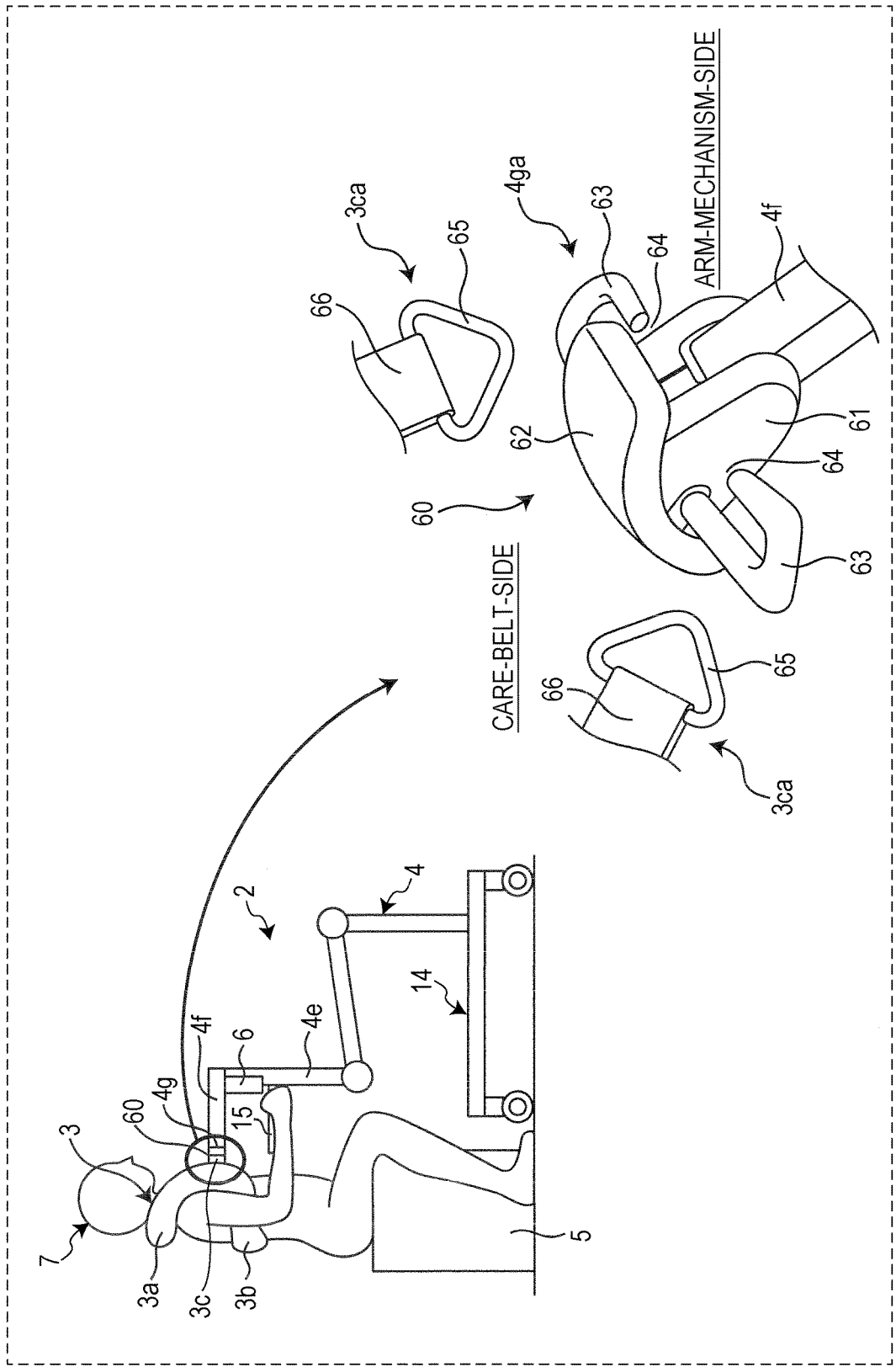
FIG. 12 illustrates a connection mechanism according to a modification of the first embodiment of the present disclosure.
Figure 13A:
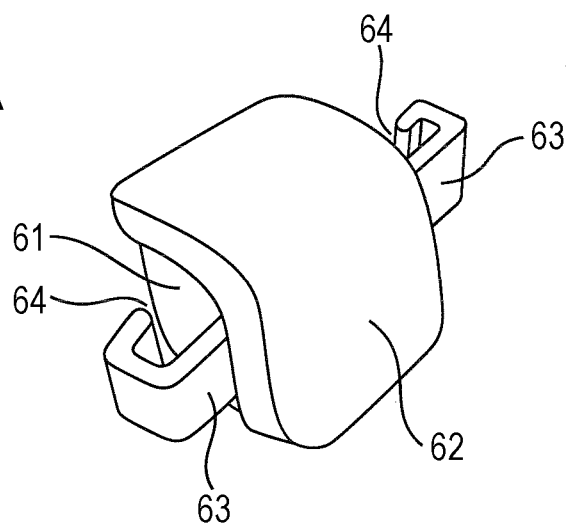
FIG. 13A illustrates the connection mechanism according to the modification of the first embodiment of the present disclosure.
Figure 13B:
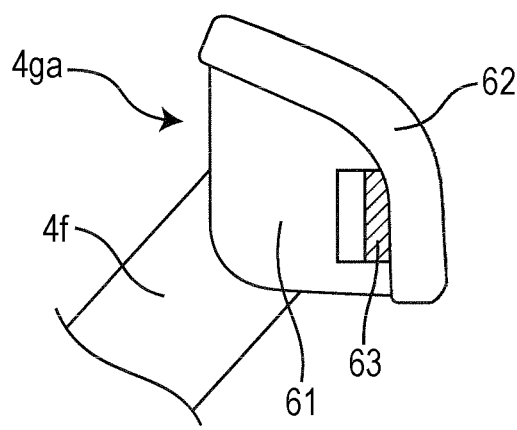
FIG. 13B illustrates the connection mechanism according to the modification of the first embodiment of the present disclosure.

FIG. 12 illustrates the connection mechanism 60 including a connection member 4ga and a connection member 3ca. The connection member 4ga is a specific example of the connector 4g of the arm mechanism 4, and the connection member 3ca is a specific example of the connector 3c of the care belt 3. The connection mechanism 60 is attachable and removable. FIGS. 13A and 13B are partial views of the connection mechanism 60.

Referring to FIGS. 12, 13A, and 13B, the connection member 4ga of the arm mechanism 4 includes a connection fastener 61, a mat portion 62, and a pair of J-shaped engagement portions 63. The connection fastener 61 is fixed to a back end (an upper end in FIG. 12) of a fourth arm 4f. The mat portion 62 covers a surface of the connection fastener 61 facing the care-receiver 7. The engagement portions 63 protrude from both sides of the connection fastener 61. One end of each of the engagement portions 63 is fixed to a corresponding side surface of the connection fastener 61. The other end of each of the engagement portions 63 is separated by a gap 64 from the corresponding side surface of the connection fastener 61. Because the mat portion 62, which is soft, is present on the surface of the connection fastener 61 facing the care-receiver, even if the care-receiver 7 comes into contact with the connection member 4ga, impact or pain due to the contact can be reduced.

The connection member 3ca of the care belt 3 includes a pair of left and right belt members 66 and triangular-frame-shaped engagement members 65. One end of each of the belt members 66 is fixed to a corresponding one of the first holder 3a and the second holder 3b. Each of the engagement members 65 is attached to the other end of a corresponding one of the belt members 66.

Therefore, a user can engage the left and right engagement members 65 of the connection member 3ca of the care belt 3 with the engagement portions 63 through the left and right gaps 64 of the connection member 4ga of the arm mechanism 4. Because the left and right gaps 64 are formed on the arm mechanism 4 side, when the engagement members 65 are inserted into the engagement portions 63 through the left and right gaps 64, the engagement members 65 engage with the engagement portions 63 and are not removed from the engagement portions 63 when pulled toward the care-receiver 7. Thus, a user can easily connect the connection member 4ga of the arm mechanism 4 and the connection member 3ca of the care belt 3 to each other.

A user can easy to disengage the connection members 4ga and 3ca from each other by loosening the engagement members 65 toward the arm mechanism 4 and removing the engagement members 65 from the engagement portions 63 through the left and right gaps 64.

Figure 13C:
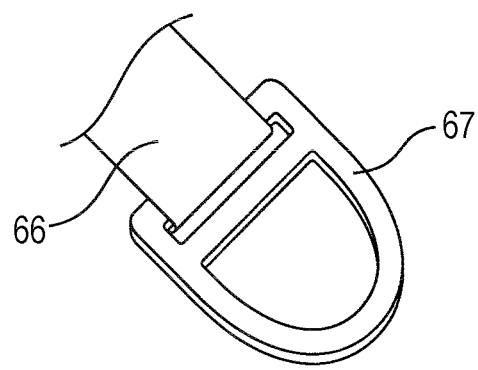
FIG. 13C illustrates a connection mechanism according to a modification of the first embodiment of the present disclosure.

FIG. 13C illustrates an engagement member 67, which is another example of an engagement member of the connection member 3ca of the care belt 3. The engagement member 67 is a D-shaped metal member and has the same function as the engagement member 65.

Preferably, the connector 3c is made of a material that is less elastic than the first holder 3a and the second holder 3b. In this case, the connector 3c does not extend when the care belt 3 is pulled by the arm mechanism 4, and therefore the connector 3c can more reliably transfer an external force from the arm mechanism 4 to the holder unit 3g.

Walking Mechanism 14

The walking mechanism 14 includes a rectangular plate 14e, a pair of front wheels 14a, a pair of rear wheels 14b, front brakes 14c, and rear brakes 14d. The walking mechanism 14 is placed on the floor 13. The pair of front wheels 14a, which are rotatable, are disposed at a pair of front corners of the rectangular plate 14e. The pair of rear wheels 14b, which are rotatable, are disposed at a pair of rear corners of the rectangular plate 14e. The front brakes 14c brake the front wheels 14a. The rear brakes 14d brake the rear wheels 14b. The arm mechanism 4 is disposed on an upper part of the walking mechanism 14. That is, the arm mechanism 4 stands on a front central part of the rectangular plate 14e and is supported by the rectangular plate 14e. For example, in a state illustrated in FIG. 3C, when the care-receiver 7 applies a force in the forward direction (the leftward direction in FIG. 3C) to the walking mechanism 14, the pair of front wheels 14a and the pair of rear wheels 14b rotate. Thus, the walking mechanism 14 can assist the care-receiver 7 in walking. In this example, the pair of front wheels 14a and the pair of rear wheels 14b rotate when the care-receiver 7 pushes the walking mechanism 14. For example, either or both of the pair of front wheels 14a and the pair of rear wheels 14b may be connected to a motor. In this case, the walking mechanism 14 can assists the care-receiver 7 in applying a pushing force, so that the care-receiver 7 can walk easily. For example, the front brakes 14c or the rear brakes 14d may be electromagnetic brakes. In this case, the front wheels 14a or the rear wheels 14b can be braked on or off by using the input interface 6. The front wheels 14a or the rear wheels 14b can be braked by activating the brakes 14c or 14d. The front wheels 14a or the rear wheels 14b can be released by deactivating the brakes 14c or 14d. The front brakes 14c and the rear brakes 14d need not be electromagnetic brakes and may be manual brakes. The number and size of wheels are not limited. For example, the walking mechanism 14 may include, in addition to the pair of front wheels 14a and the pair of rear wheels 14b, another wheel at the center of the rectangular plate 14e.

Arm Mechanism 4

The arm mechanism 4 is disposed on an upper part of the walking mechanism 14. An end of the arm mechanism 4 is connected to the holder unit 3g through the connector 3c. The arm mechanism 4 is, for example, a robot arm having two degrees of freedom. The arm mechanism 4 includes a first motor 41, a first encoder 43 that detects the number of rotations (for example, the rotation angle) of the rotation shaft of the first motor 41, a second motor 42, and a second encoder 44 that detects the number of rotations (for example, the rotation angle) of the rotation shaft of the second motor 42. The first encoder 43 and the second encoder 44 are examples of a position sensor. The controller 12 of the control device 11 controls the first motor 41 and the second motor 42 on the basis of position information that is obtained by converting rotation angle information from the first encoder 43 and the second encoder 44 into position information of the arm mechanism 4. Instead of converting the rotation angle information from the first encoder 43 and the second encoder 44, the position information of the arm mechanism 4 may be directly obtained by providing the arm mechanism 4 with a position sensor. Here, the position information of the arm mechanism 4 is, for example, information on the position of a connection portion between the arm mechanism 4 and the care belt 3, which is an example of a holding mechanism. This control enables the following. First, referring to FIGS. 3A to 3C, when assisting the care-receiver 7 in standing up from a sitting position so that buttocks 7e leave the seat 5, the robot system 1 can simultaneously pull the first holder 3a and the second holder 3b of the holder unit 3g diagonally in the forward direction from the care-receiver 7 and then in the upward direction. Second, referring to FIGS. 4A to 4C, when assisting the care-receiver 7 in sitting on the seat 5 from a standing position, the robot system 1 can simultaneously pull the first holder 3a and the second holder 3b of the holder unit 3g at least in the downward direction from the care-receiver 7, then in a downward and slightly forward direction, and then in a downward and slightly backward direction.

To be more specific, the arm mechanism 4 is a robot arm including a first arm 4c, a second arm 4d, a third arm 4e, the fourth arm 4f, a first drive unit 4a, and a second drive unit 4b. A lower end of the first arm 4c is fixed to a front central part of the rectangular plate 14e. A front end of the second arm 4d is rotatably connected to an upper end of the first arm 4c through a first joint, in which the first drive unit 4a is disposed. A back end of the second arm 4d is rotatably connected to a lower end of the third arm 4e through a second joint, in which the second drive unit 4b is disposed. An upper end of the third arm 4e is fixed to a front end of the fourth arm 4f so that the axial directions of the third arm 4e and the fourth arm 4f are perpendicular to each other and so that the third arm 4e and the fourth arm 4f form an L-shape. The connector 4g is disposed at a back end of the fourth arm 4f. The connector 4g is removably connected to the connector 3c of the care belt 3.

The first drive unit 4a is disposed in the first joint between the first arm 4c and the second arm 4d. The first drive unit 4a includes, for example, the first motor 41, which rotates the second arm 4d relative to the first arm 4c, and the first encoder 43, which detects the rotation angle information of the first motor 41. Thus, under the control of the controller 12 described below, the first drive unit 4a can rotate the second arm 4d by a predetermined angle relative to the first arm 4c. The second drive unit 4b is disposed in the second joint between the second arm 4d and the third arm 4e. The second drive unit 4b includes, for example, the second motor 42, which rotates the third arm 4e relative to the second arm 4d, and the second encoder 44, which detects the rotation angle information of the second motor 42. The rotation angle information from the first encoder 43 and the second encoder 44 is converted to the position information of the arm mechanism 4 and is used as position information by the controller 12. Thus, under the control of the controller 12 described below, the second drive unit 4b can rotate the third arm 4e by a predetermined angle relative to the second arm 4d so that the third arm 4e is moved to a desired position.

A handle 15 protrudes in the backward direction (for example, toward the care-receiver 7) from a middle part of the third arm 4e. The care-receiver 7 grasps the handle 15 with both hands when the care-receiver 7 performs a sitting motion or a standing motion. The handle 15 may be long so that the care-receiver 7 can place the elbows on the handle 15. In this case, the care-receiver 7 can grasp the handle 15 when standing up, and the care-receiver 7 can walk more stably by placing the elbows on the handle 15. The fourth arm 4f may include a cushioning member, made of urethane foam or the like, in an upper part thereof. In this case, even if the care-receiver 7 falls forward and the face or the upper body of the care-receiver 7 is hit by the fourth arm 4f, the impact can be reduced.

Input Interface 6

Figure 5:
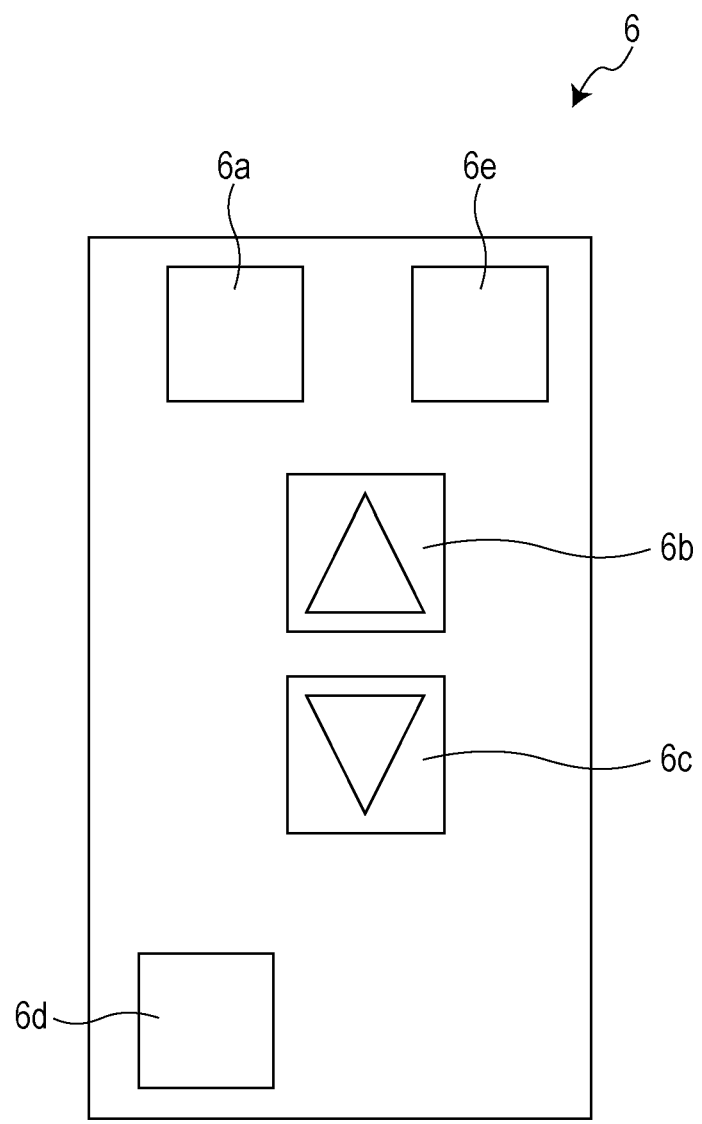
FIG. 5 is a schematic view illustrating an input interface according to the first embodiment of the present disclosure.

The input interface 6, such as an operation panel on which buttons and the like are arranged, is disposed on a front part of the fourth arm 4f so as to protrude downward. By disposing the input interface 6 in this way, the care-receiver 7 in a sitting position can operate the input interface 6 from a side of the arm mechanism 4. FIG. 5 illustrates an example of the input interface 6. A power ON/OFF button 6a, a brake ON/OFF button 6d, an up button 6b that is used when performing a standing motion, a down button 6c that is used when performing a sitting motion, and an initial position button 6e that is used to move the arm mechanism 4 to an initial position are arranged. (For example, the robot system 1 is powered on when the power ON/OFF button 6a is pressed and powered off when the power ON/OFF button 6a is released; and the brakes are powered on when the brake ON/OFF button 6d is pressed and powered off when the brake ON/OFF button 6d is released.) Referring to FIG. 3A, the initial position of the arm mechanism 4 is, for example, a position near the front side of the care-receiver 7. The input interface 6 can be removed from the front part of the fourth arm 4f and used as a remote controller that the care-receiver 7 can operate while holding it with his/her hand.

Force Detector 17

The force detector 17 is disposed in the arm mechanism 4. The force detector 17 detects a force that the care-receiver 7 applies to the arm mechanism 4. The force detector 17 starts detecting the force after the care-receiver 7 inputs motion start information of the robot system 1 through the input interface 6 (by, for example, pressing the up button 6b or the down button 6c) to start a control operation of the control device 11 of the robot system 1. The force detector 17 detects a force that the care-receiver 7 applies to the arm mechanism 4, the motion information generator 10 generates motion information on the basis of the force detected by the force detector 17 and the position of the arm mechanism 4, and the controller 12 controls the motion of the arm mechanism 4.

To be specific, referring to FIG. 1A, the force detector 17 is disposed near a connection portion between the upper end of the third arm 4e and the front end of the fourth arm 4f of the arm mechanism 4. The force detector 17 detects information of a force applied to the arm mechanism 4 from the outside (for example, from the care-receiver 7). The information detected by the force detector 17 and the time are stored in the motion information database 8 via the database I/O unit 9. For example, the force detector 17 is a two-axis force sensor that can measure a force in the up-down direction and a force in the front-back direction of the robot system 1 or a three-axis force sensor that can additionally measure a rotation in a lateral direction.

Timer 16

The timer 16 outputs instructions for operating the database I/O unit 9 and the controller 12 to the database I/O unit 9 and the controller 12 at predetermined intervals (for example, every 1 msec).

Database I/O Unit 9

The database I/O unit 9 performs input and output of data (information) between the motion information database 8 and the controller 12, the force detector 17, and the motion information generator 10.

Motion Information Database 8

When the controller 12 is activated on the basis of instructions from the timer 16, the database I/O unit 9 and the controller 12 are operated, and the position information of the arm mechanism 4 is generated at predetermined intervals (for example, every 1 msec) by using the instructions from the timer 16. (For example, the position information of the arm mechanism 4 is obtained by converting the rotation angle information from the first encoder 43 and the second encoder 44 into the position information.) The generated position information and the time are output to the motion information database 8 via the database I/O unit 9 and stored in the motion information database 8. As described below, the motion information generator 10 generates motion information on the basis of information of a force detected by the force detector 17, the position information, and time information, which are stored in the motion information database 8. The motion information database 8 stores the motion information. Moreover, the motion information database 8 stores, as motion information, information about a control flag that represents whether or not to generate a motion on the basis of the force information detected by the force detector 17; an initial position flag that represents which of the positions in a series of motions stored in the motion information database 8 is the initial position of the arm mechanism 4; and a control parameter that is used to generate a motion on the basis of the information of the force detected by the force detector 17. Furthermore, the motion information generator 10 generates, as motion information, information about the progress of the motion of the robot system 1 and stores the information in the motion information database 8. For example, the motion information generator 10 sets "1" as the progress information when the up button 6b or the down button 6c is pressed and the button 6b or 6c is subsequently released. The motion information generator 10 changes the previous progress information from "1" to "0".

FIG. 6 shows an example of the contents of the motion information stored in the motion information database 8.

(1) The column "TIME" represents information related to the time when the arm mechanism 4 is operating. The time is measured in milliseconds (msec).

(2) The column "POSITION" represents the position information of the arm mechanism 4, which is obtained by converting the angle information detected by the first and second encoders 43 and 44 of the arm mechanism 4. To be specific, referring to FIG. 1A, the position information is represented by using a relative coordinate system having the origin O at an end of the arm mechanism 4 (for example, the lower end of the first arm 4c shown in FIG. 1A), an x-axis extending in a positive direction that is opposite to the direction in which the robot system 1 moves, and a z-axis extending in a positive direction that is the upward direction. The position is measured in meter (m).

(3) The column "FORCE" represents a force that is applied to the arm mechanism 4 and that is measured by the force detector 17 of the arm mechanism 4. To be specific, the force has an x-component, which is positive in a direction opposite to the direction in which the robot system 1 moves, and a z-component, which is positive in the upward direction. The force is measured in newton (N).

(4) The column "CONTROL FLAG" stores "0" in a case where the arm mechanism 4 is controlled on the basis of only the "POSITION" (described in (2)) and stores "1" in a case where the arm mechanism 4 is controlled on the basis of the "POSITION" (described in (2)) and the "FORCE" (described in (3)). The control flag may be set for each of the x-axis and the z-axis. If the x-axis is controlled on the basis of only the "POSITION", the control flag may be set for only the z-axis. In this example, the control flag is stored as (x-axis control flag, z-axis control flag).

Figure 8A:
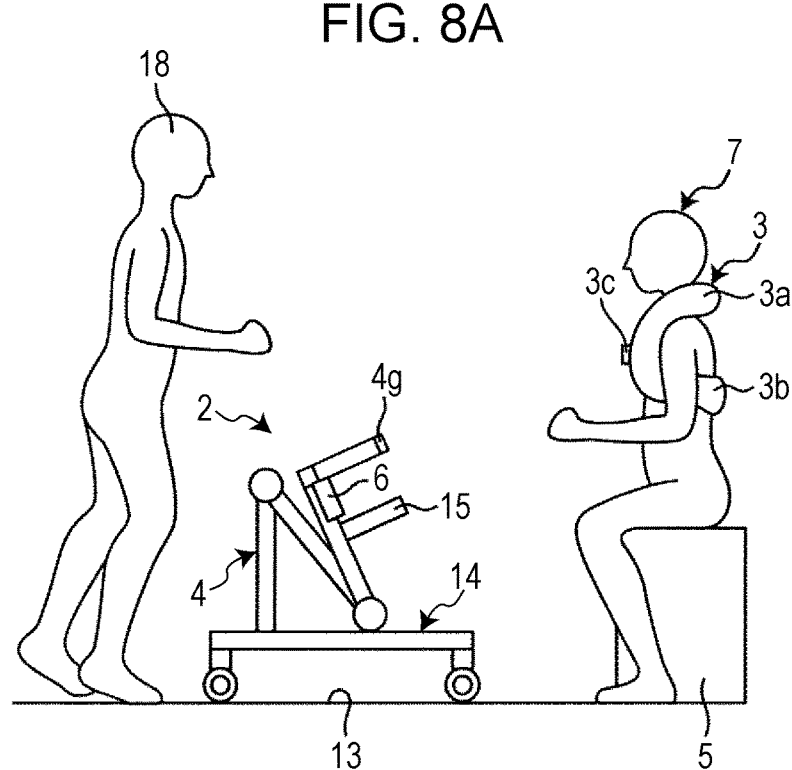
FIG. 8A illustrates a motion of the robot system according to the first embodiment of the present disclosure.
Figure 8B:
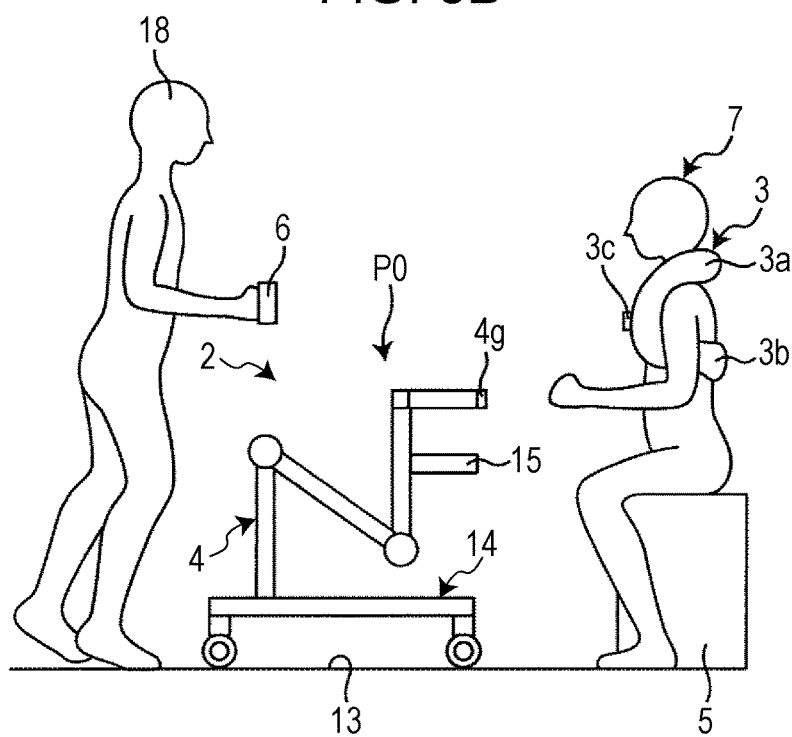
FIG. 8B illustrates a motion of the robot system according to the first embodiment of the present disclosure.

(5) The column "INITIAL POSITION FLAG" stores a flag representing the coordinates of an initial position to which the arm mechanism 4 moves as illustrated in FIG. 8B from a state in which the arm mechanism 4 is folded for storage as illustrated in FIG. 8A. The initial position flag is "0" or "1". The flag "1" represents that the position of the arm mechanism 4 at the time is the initial position, and the flag "0" represents that the position at the time is not the initial position.

(6) The column "CONTROL PARAMETER" stores a control parameter that is used by the motion information generator 10 (described below) when controlling the arm mechanism 4 on the basis of the value of a force detected by the force detector 17. The control parameter includes two constants for each of the x-axis and the z-axis. To be specific, for the z-axis, "auz" denotes a constant in a case where a force is applied in the upward direction (for example, the positive z-axis direction from the origin O in FIG. 1A), and "adz" denotes a constant in a case where a force is applied in the downward direction (for example, the negative z-axis direction from the origin O in FIG. 1A). For the x-axis, "aux" denotes a constant in a case where a force is applied toward the care-receiver 7 (for example, the positive x-axis direction from the origin O in FIG. 1A), and "adx" denotes a constant when a force is applied in a direction away from the care-receiver 7 (for example, the negative x-axis direction from the origin O in FIG. 1A).

(7) The column "PROGRESS INFORMATION" stores information regarding the progress of a motion of the robot system 1. The column stores "1" for the time corresponding to the position of the robot system 1 at the present time (that is, when performing a control operation), and stores "0" for other times. The column stores "0" for all times when the robot system 1 has not moved to the initial position. Immediately after the robot system 1 has moved to the initial position, the column stores "1" for the time at which "1" is stored as the initial position flag.

Motion Information Generator 10

On the basis of an instruction for generating motion information, the motion information generator 10 obtains time information, position information, and force information stored in the motion information database 8 through the database I/O unit 9. On the basis of the position information and the force information, the motion information generator 10 generates motion information of the arm mechanism 4 and stores the motion information in the motion information database 8.

Moreover, when a caregiver 18 or the care-receiver 7 presses the up button 6b or the down button 6c of the input interface 6 of the robot 20, the motion information generator 10 changes the time and the position stored in the motion information database 8 so that the arm mechanism 4 decelerates for a predetermined time (such as 2 seconds) after the button 6b or 6c is pressed. The motion information database 8 stores the changed time and position as motion information. The instruction, which causes the motion information generator 10 to start generating the motion information, is given by the controller 12 to the motion information generator 10 through the database I/O unit 9.

The motion information generator 10 generates progress information when the caregiver 18 or the care-receiver 7 presses the up button 6b or the down button 6c. The motion information database 8 stores the progress information.

Figure 7B:
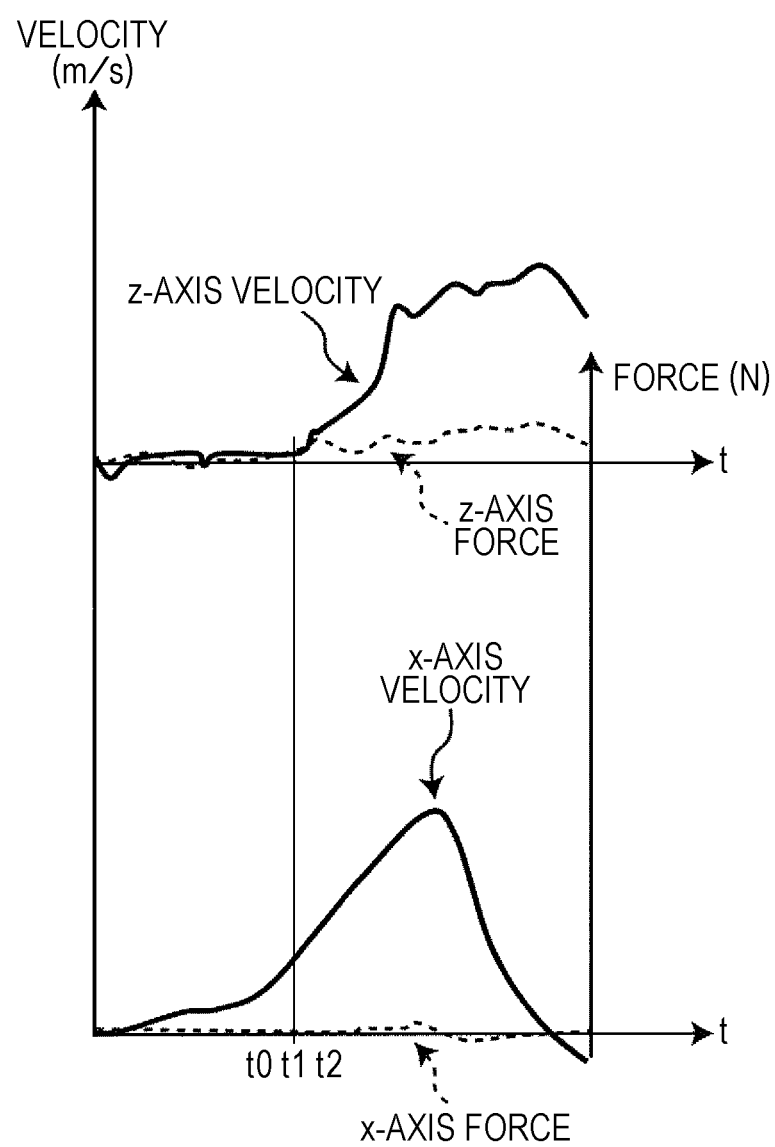
FIG. 7B is graph of motion information according to the first embodiment of the present disclosure.
Figure 7C:
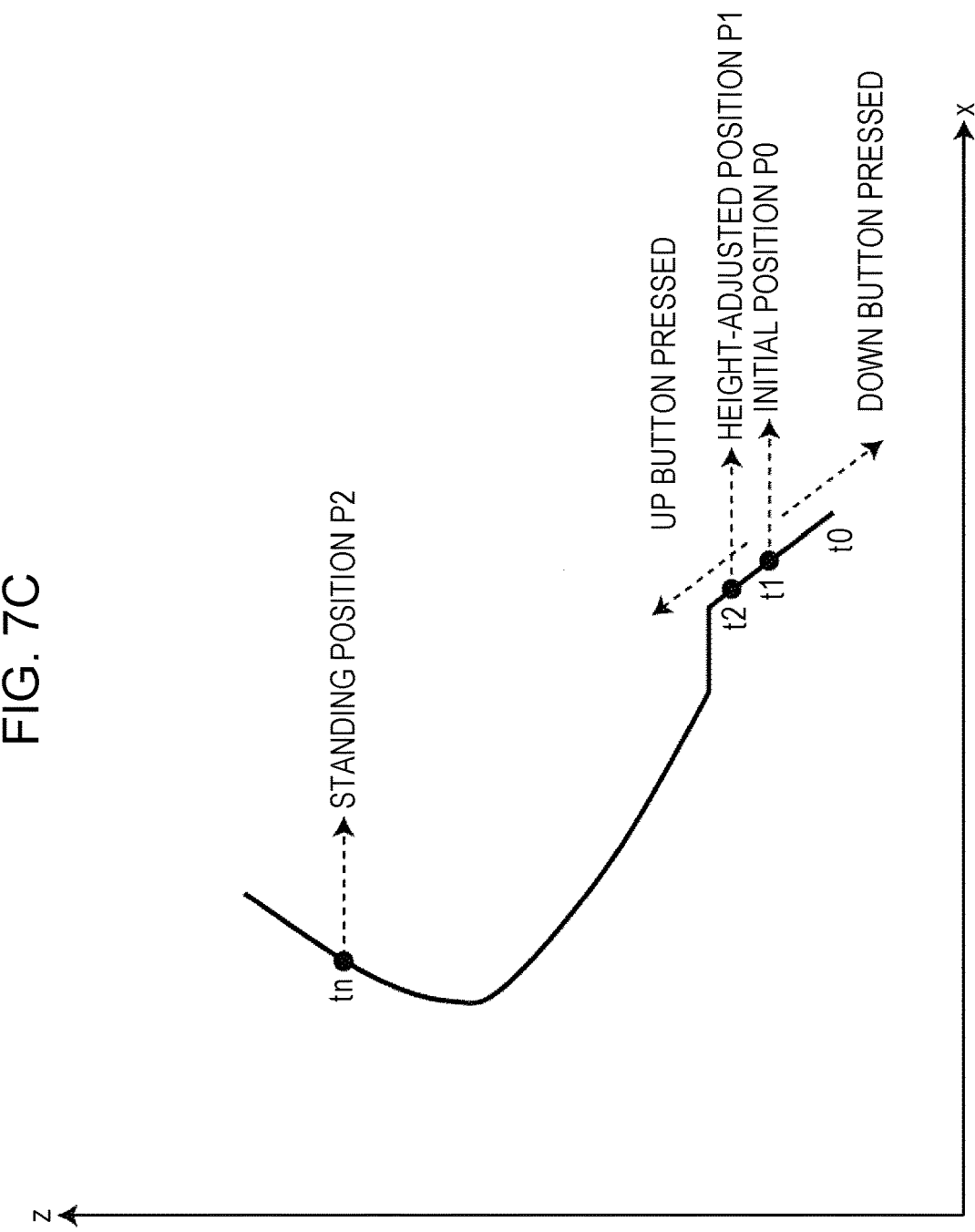
FIG. 7C is graph of motion information according to the first embodiment of the present disclosure.

Referring to FIG. 7A to 7C, how the motion information is generated will be described in more detail. FIGS. 7A to 7C are graphs representing the motion information generated by the motion information generator 10. In FIGS. 7A and 7B, the horizontal axis represents the time; a vertical axis represents the x-axis velocity (calculated, for example, from the x-axis position and the time) and the z-axis velocity (calculated, for example, from the z-axis position and the time); and the vertical axis also represents the x-axis force and the z-axis force. FIG. 7A is a graph when the care-receiver 7 applies a force in the downward direction, and FIG. 7B is a graph when the care-receiver 7 applies a force in the upward direction. In FIG. 7C, the horizontal axis represents the x-axis position and the vertical axis represents the z-axis position.

First, referring to FIG. 8A, the care-receiver 7 sits on the seat 5, such as a bed, placed on the floor 13. The caregiver 18 moves the robot system 1, whose arm mechanism 4 is folded for storage, to a position in front of the care-receiver 7 and applies the brakes to the wheels 14a and 14b of the walking mechanism 14 by pressing the brake ON/OFF button 6d of the input interface 6.

Next, referring to FIG. 8B, for example, when the caregiver 18 or the care-receiver 7 presses the initial position button 6e of the input interface 6 of the robot 20, the arm mechanism 4 is driven under the control by the controller 12 and the robot system 1 moves to the initial position. To be specific, the robot system 1 is moved to the initial position P0 shown in FIG. 7C.

Next, if the height of the connector 3c of the care belt 3 put on the care-receiver 7 does not match the height of the connector 4g of the arm mechanism 4 as illustrated in FIG. 8B, the caregiver 18 or the care-receiver 7 adjusts the height of the connector 4g of the arm mechanism 4. In the example shown in FIG. 8B, it is necessary to move the connector 4g of the arm mechanism 4 upward. Therefore, the caregiver 18 or the care-receiver 7 presses the up button 6b of the input interface 6 to adjust the height of the connector 4g. How the height is adjusted is determined, for example, in accordance with the motion information database 8 of FIG. 6 (for example, along the path shown in FIG. 7C). For example, the controller 12 performs control so that, if the caregiver 18 or the care-receiver 7 presses the up button 6b at time t1, at which the progress information is "1", the connector 4g moves in the upward direction along the path shown in FIG. 7C, that is, toward time t2 in FIG. 6 (for example, downward in the table of FIG. 6); and if the caregiver 18 or the care-receiver 7 presses the down button 6c, the connector 4g moves in the downward direction along the path shown in FIG. 7C, that is, toward time t0 in FIG. 6 (for example, upward in the table of FIG. 6). In the example shown in FIG. 8B, it is necessary to move the connector 4g of the arm mechanism 4 upward. Therefore, the caregiver 18 or the care-receiver 7 presses the up button 6b of the input interface 6 to move connector 4g upward along the path shown in FIG. 7C. When the height has been adjusted, the care-receiver 7 or the caregiver 18 releases the up button 6b to stop the connector 4g at the position.

To prevent the connector 4g from suddenly moving when the caregiver 18 or the care-receiver 7 presses the up button 6b of the input interface 6, the motion information generator 10 changes the motion information database 8 so as to decelerate the connector 4g. For example, when the caregiver 18 or the care-receiver 7 presses the up button 6b of the input interface 6, the motion information generator 10 changes the motion information database 8 so that the time t is doubled for a predetermine time (for example, 2 seconds) from the time at which the progress information of the motion information database 8 is "1". For example, the time t is doubled for two seconds from the time at which the progress information in the motion information database 8 shown in FIG. 6 is "1" in the downward direction in the table of FIG. 6. When the caregiver 18 or the care-receiver 7 presses the down button 6c of the input interface 6, the motion information generator 10 changes the motion information database 8 so that the time t is doubled for a predetermine time (such as 2 seconds) from the time at which the progress information of the motion information database 8 is "1". For example, the time t is doubled for two seconds from the time at which the progress information in the motion information database 8 shown in FIG. 6 is "1" in the upward direction in the table of FIG. 6. For another example, by decreasing the number to be multiplied to the time t from 2, 1.5, and to 1 in a predetermined time (such as 2 seconds), it is possible to prevent a sudden acceleration of the connector 4g after a lapse of two seconds. When the care-receiver 7 or the caregiver 18 releases the up button 6b or the down button 6c, the controller 12 stops the control and the motion information generator 10 changes the previous progress information from "1" to "0" and changes the progress information at the time when the control is stopped to "1". FIG. 8B illustrates the robot system 1 before adjustment (for example, the initial position P0 in FIG. 7), and FIG. 8C illustrates the robot system 1 after adjustment (for example, the position P1 in FIG. 7).

Figure 8C:
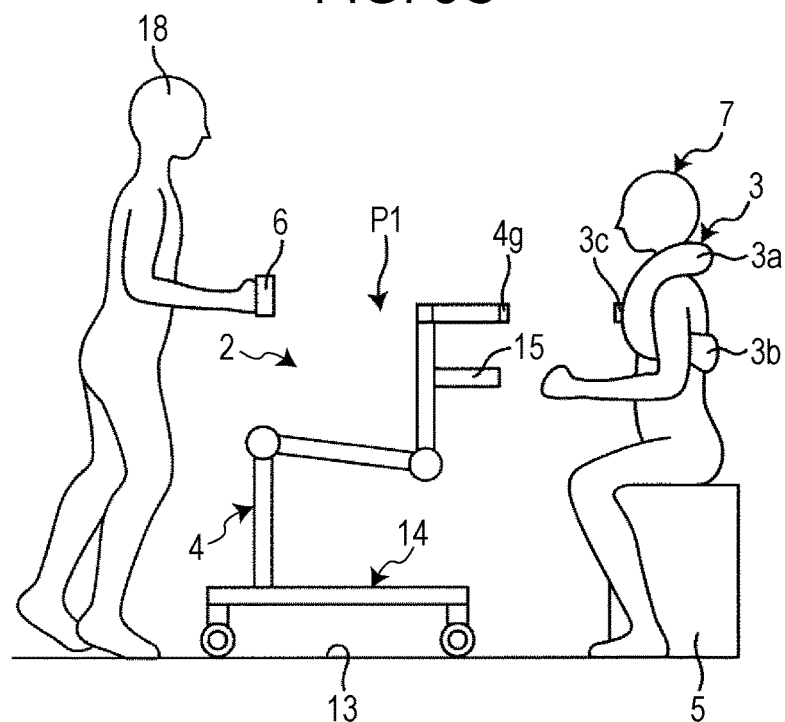
FIG. 8C illustrates a motion of the robot system according to the first embodiment of the present disclosure.

By performing adjustment as described above, the height of the connector 3c of the care belt 3 and the height of the connector 4g of the arm mechanism 4 can be adjusted as illustrated in FIG. 8C.

Figure 8D:
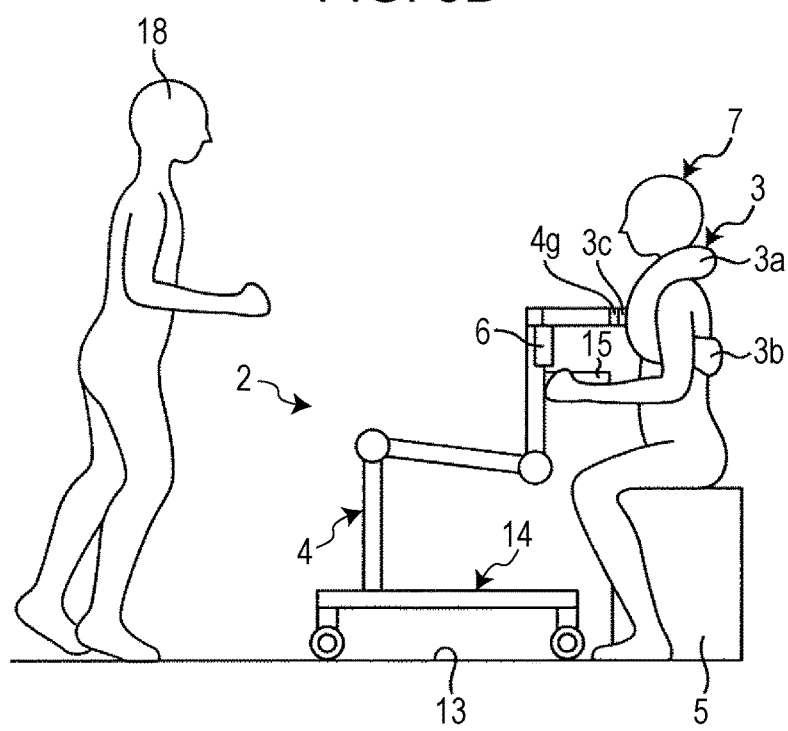
FIG. 8D illustrates a motion of the robot system according to the first embodiment of the present disclosure.

Next, referring to FIG. 8D, the care-receiver 7 or the caregiver 18 connects the connector 3c of the care belt 3 and the connector 4g of the arm mechanism 4 to each other. At this time, the caregiver 18 may attach the input interface 6 to the arm mechanism 4, and the care-receiver 7 may perform subsequent operations. Alternatively, the caregiver 18 may continue to operate the input interface 6 without attaching the input interface 6 to the arm mechanism 4.

Figure 9A:
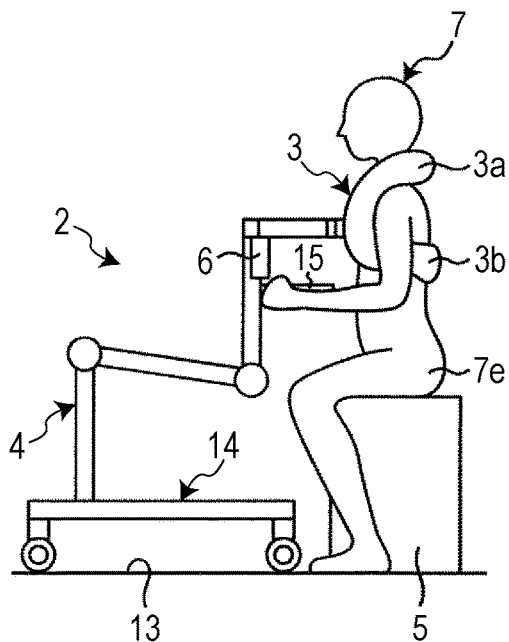
FIG. 9A illustrates a standing motion of the robot system according to the first embodiment of the present disclosure.

Next, referring to FIG. 9A, the care-receiver 7 starts a standing motion from a sitting position on the seat 5. When the care-receiver 7 or the caregiver 18 presses the up button 6b of the input interface 6, the arm mechanism 4 starts a standing motion. When the care-receiver 7 or the caregiver 18 releases the up button 6b, the arm mechanism 4 stops at the position. To prevent the arm mechanism 4 from suddenly moving when the care-receiver 7 or the caregiver 18 presses the up button 6b, as in the aforementioned case where the up button 6b is pressed for height adjustment, the motion information generator 10 may increase the value of the time t (for example, doubles the time t) for a predetermine time (for example, 2 seconds) from the time at which the progress information of the motion information database 8 is "1". By doing so, it is possible to prevent the arm mechanism 4 from starting a standing motion suddenly.

Figure 9B:
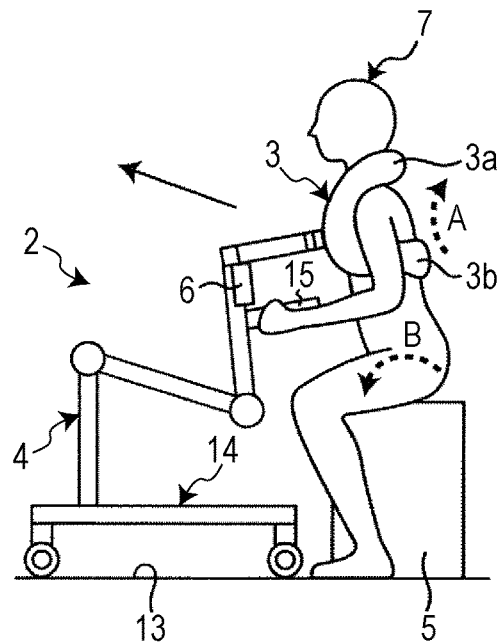
FIG. 9B illustrates a standing motion of the robot system according to the first embodiment of the present disclosure.
Figure 9C:
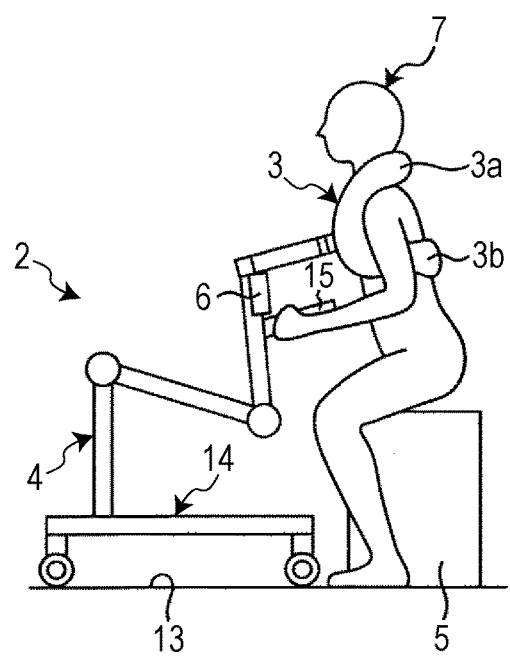
FIG. 9C illustrates a standing motion of the robot system according to the first embodiment of the present disclosure.

Next, referring to FIGS. 9B and 9C, after being decelerated for a predetermined time, the controller 12 controls the motion of the arm mechanism 4 in accordance with the motion information stored in the motion information database 8. For example, the connector 4g of the arm mechanism 4 is moved diagonally forward in the upward direction as shown by an arrow in FIG. 9B. Until the buttocks 7e of the care-receiver 7 leave the seat 5, the controller 12 controls the motion of the arm mechanism 4 by using only the position stored in the motion information database 8 for both the x-axis and the z-axis.

Figure 9D:
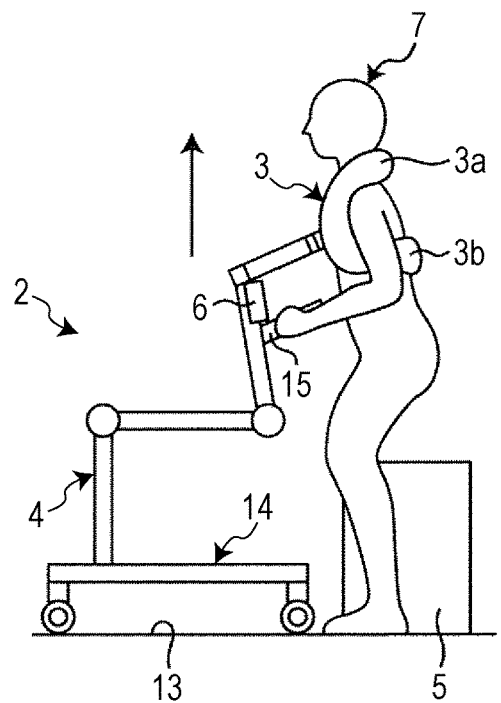
FIG. 9D illustrates a standing motion of the robot system according to the first embodiment of the present disclosure.

Next, referring to FIG. 9D, when the arm mechanism 4 assists the care-receiver 7 in standing in the upward direction, regarding the z-axis direction, the controller 12 controls the motion of the arm mechanism 4 on the basis of the position information and the force information stored in the motion information database 8. Referring to FIG. 9C, the motion information generator 10 can generate, as motion information, a motion of the connector 4g of the arm mechanism 4 with which the connector 4g moves upward while moving forward. Moreover, because the first holder 3a of the holder unit 3g holds the upper body of the care-receiver 7, backward bend of the upper body of the care-receiver 7 functions effectively, and the care-receiver 7 can stand up easily.

Next, referring to FIG. 9D, the motion information generator 10 determines a velocity with which the connector 4g of the arm mechanism 4 moves the care-receiver 7 upward on the basis of z-axis force information of the arm mechanism 4.

To be specific, when a z-axis force F is applied in the downward direction as shown in a part of FIG. 7A after the time t1, the connector 4g of the arm mechanism 4 moves the care-receiver 7 upward with a predetermined velocity sz. The motion information generator 10 may set the velocity sz at a constant velocity or may determine the velocity sz by using an expression (1) $sz=\alpha F+s0$ (where $\alpha$ is a constant and s0 is an initial velocity). If the value of the constant α in expression (1) is negative, the velocity sz increases in the upward direction as the z-axis force F increases (that is, the value of F increases in the negative direction), and, as the z-axis force F decreases, the velocity sz decreases. In this way, the motion information generator 10 may change the velocity sz in accordance with the force F in the z-axis direction.

For another example, referring to FIG. 7B, the motion information generator 10 may set the value of the constant α at a positive value in expression (1). In this case, as a force applied to the arm mechanism 4 upward in the z-axis direction increases (that is, the value of the force increases in the positive direction), for example, the connector 4g of the arm mechanism 4 is accelerated in the upward direction, and, as the z-axis force F acting on the arm mechanism 4 in the z-axis direction decreases, the connector 4g is decelerated. In this way, the motion information generator 10 may increase or decrease the velocity of the connector 4g in the movement direction in accordance with the z-axis force F applied to the arm mechanism 4.

In this case, if the lower body of the care-receiver 7 has a sufficient muscular strength and the care-receiver 7 can stand up with his/her own muscular strength, the connector 4g of the arm mechanism 4 is moved upward with an increased velocity. Therefore, the care-receiver 7 can stand up smoothly.

The motion information generator 10 may obtain the constant α from the motion information database 8, may use the control parameter adz in FIG. 6 when the z-axis force F is applied to the arm mechanism 4 in the downward direction, and may use the control parameter auz in FIG. 6 when the z-axis force F is applied to the arm mechanism 4 in the upward direction. The constant α is recorded in the motion information database 8 as control parameters auz and adz in FIG. 6.

In the case where the z-axis force F is applied to the arm mechanism 4 in the downward direction, when changing the velocity of the connector 4g in accordance with the force F, the motion information generator 10 may reduce the ratio of the velocity to the force by setting the absolute value of the constant α in expression (1) at a small value. In this case, the care-receiver 7 does not have a sensation that he/she is strongly assisted, so that the robot system 1 can be used for rehabilitation in which the care-receiver 7 stands up by using the muscular strength of the lower body. Setting the absolute value of the constant α at a small value means that, for example, setting the absolute value at about 0.2 times the previous absolute value of the constant α. However, the constant α may be set at any value smaller than the previous absolute value and greater than 0.

Moreover, the motion information generator 10 may set the initial velocity s0 in expression (1) at a positive value. In this case, when the care-receiver 7 changes the direction of a force applied to the arm mechanism 4 from the upward direction to the downward direction, the velocity sz is prevented from becoming 0 when the force F becomes 0 as the sign of the force F changes from positive to negative. Thus, the care-receiver 7 can stand up smoothly.

The initial velocity s0 may be set at 0. In this case, at a time when the sign of the force F changes, the motion of the connector 4g of the arm mechanism 4 can be stopped. By doing so, it is possible to indicate, by stopping the motion of the connector 4g of the arm mechanism 4, that the care-receiver 7 is changing a force applied to the arm mechanism 4 from downward to upward, that is, the care-receiver 7 is standing up with his/her own power.

If only the z-axis velocity is changed, the connector 4g deviates from the path shown in FIG. 7C and the care-receiver 7 feels an unpleasant sensation.

To be specific, if the x-axis velocity and the z-axis velocity of the connector 4g are not changed, as illustrated in FIG. 7D, the connector 4g moves from a position p10 at time t10 to a position p20 at time t11 (see, for example, the position p10 and the position p20 on the original path K0, which is shown by a solid line in FIG. 7D).

If only the z-axis velocity of the connector 4g is increased without changing the x-axis velocity of the connector 4g, the connector 4g moves to a position p21 at time t11 as the z-axis position of the connector 4g moves further upward while the x-axis position of the connector 4g is the same as that of p20. Accordingly, the connector 4g moves along a curved path K1, which is shown in FIG. 7D by a chain line on the left side of the solid line.

If only the z-axis velocity of the connector 4g is reduced without changing the x-axis velocity of the connector 4g, the connector 4g moves from the position p10 at time t10 to a position p22 at time t11 as the z-axis position of the connector 4g moves upward to a lesser degree from that of the position p10 while the x-axis position of the connector 4g is the same as that of p20. Accordingly, the connector 4g moves along a curved path K2, which is shown in FIG. 7D by a chain line on the right side of the solid line.

Thus, if the motion information generator 10 generates the motion information of the arm mechanism 4 on the basis of the force F and the position, the path of the connector 4g of the arm mechanism 4 may considerably deviate from the original path K0, which is a curved path represented by the solid line between the paths K1 and K2 in FIG. 7D, to the path K1 and K2. That is, although the motion information generator 10 determines the original path K0 to be a natural standing path, if the motion information generator 10 changes the velocity in accordance with the position and the force, the path may deviate from the natural path K0 and a natural standing motion may not be realized. Here, the "original path K0" refers to a path that is recorded beforehand in the motion information database 8 and along which the arm mechanism 4 moves the care belt 3 (in other words, the connector 4g) so that the care-receiver 7 can perform a standing/sitting motion in a natural way. Here, a path for standing motion assistance is described as an example.

Therefore, the motion information generator 10 does not change the position information in the motion information database 8 so that the z-axis velocity of the connector 4g becomes the aforementioned z-axis velocity and the original path K0 is changed to the other path K1 or K2. Instead, without changing the original path K0, that is, the position stored in the motion information database 8, the motion information generator 10 changes the x-axis velocity so that the path of the connector 4g becomes the original path K0 with the changed z-axis velocity.

Next, by changing the time in the motion information database 8 with the motion information generator 10, the connector 4g can keep on the original path KO even though the velocity is changed. To be specific, when the connector 4g accelerates in the z-axis direction, the motion information generator 10 does not change position information at time t11 in the motion information database 8 so that the connector 4g moves to the position p21 on the other path K1. Instead, in order to move the connector 4g to a position p23 on the original path KO, whose z-axis position is the same as the position p21, the motion information generator 10 changes the motion information so that the time corresponding to the position p23 in the motion information database 8 is changed from time t12, which is stored in in the motion information, to time t11, which is earlier than t12.

In other words, the first encoder 43 and the second encoder 44 measure the third position p21 of the care belt 3 (or the connector 4g) at the third time t11, which is between the first time t10 and the second time t12. Next, the force detector 17 measures a first force, which is applied to the arm mechanism 4 via the care belt 3 and the connector 4g, at the third time t11. Next, on the basis of the third position p21 and the first force, the motion information generator 10 changes the third position p21 to the position p23 on the original path KO at the time t12, which is after the third time t11. Accordingly, the control device 11 controls the arm mechanism 4 so that the care belt 3 (or the connector 4g) draws a predetermined path K0. Here, the predetermined path K0 is a path that is convexly curved in the forward direction from the care-receiver 7. For example, the predetermined path K0 is a semi-arc-shaped (C-shaped) path along which the connector 4g does not move in the backward direction from the care-receiver 7 and that passes through fixed points from the initial point to the terminal point. As a result, the motion information generator 10 changes the motion information so that the connector 4g can keep on the predetermined path KO when the velocity is changed. The time t12 may be any time after the third time t11. However, because a time at which the connector 4g deviates from the original path KO is not allowed, the time t12 is set at any appropriate time before the last time tf recorded in the motion information database 8 and corresponding to a position on the original path K0. It there is any possibility that the connector 4g deviates from the original path K0, the time t12 may be set at the last time tf. In the present embodiment, the velocity in the z-axis direction is changed on the basis of the force in the z-axis direction. Alternatively, after changing the velocity in the x-axis direction by using the control parameters aux and adx FIG. 6, the velocity in the z-axis direction may be changed so that the connector 4g can keep on the original path K0.

Figure 9E:
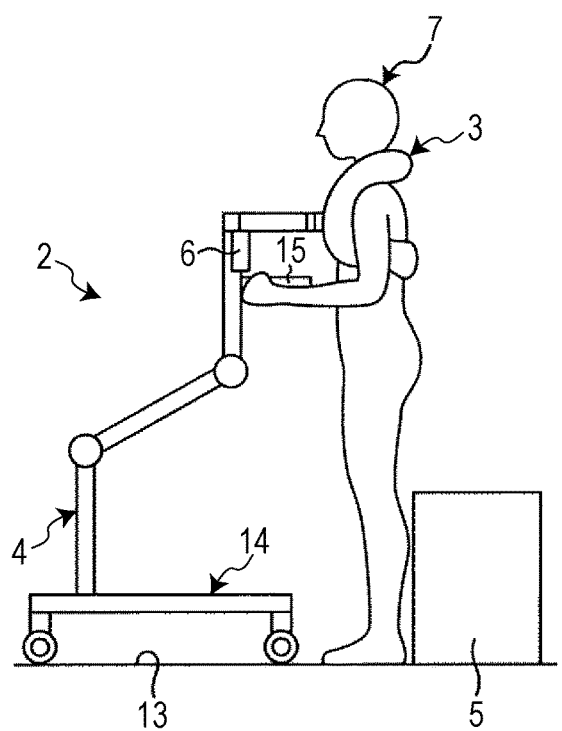
FIG. 9E illustrates a standing motion of the robot system according to the first embodiment of the present disclosure.

Next, subsequent to FIG. 9D, when the connector 4g of the arm mechanism 4 reaches the standing motion finishing point shown in FIG. 9E, the care-receiver 7 or the caregiver 18 releases the up button 6b of the input interface 6 to stop the connector 4g (at, for example, the standing position P2 in FIG. 7C). Therefore, it is possible to adjust the standing position in accordance with the height of the care-receiver 7. At the time when the motion of the connector 4g of the arm mechanism 4 stops (for example, the time to in FIG. 7C), the "PROGRESS INFORMATION" is changed to "1".

In a case where the arm mechanism 4 has been moving on the basis of position information and force information stored in the motion information database 8 before reaching the standing motion finishing point, when the care-receiver 7 or the caregiver 18 releases the up button 6b of the input interface 6 (at, for example, the time shown in FIG. 9D) and subsequently presses the up button 6b of the input interface 6 again to restart, motion information is generated by using only the position stored in the motion information database 8. That is, acceleration or deceleration is not performed on the basis of the force. To be specific, the control flag (0, 1) of the motion information database 8 is changed to (0, 0). On the other hand, if the arm mechanism 4 has been moving on the basis of position information stored in the motion information database 8 before reaching the standing motion finishing point, when the care-receiver 7 or the caregiver 18 releases the up button 6b of the input interface 6 (at, for example, the time shown in FIG. 9B) and subsequently presses the up button 6b of the input interface 6 again to restart, motion information is generated by using only the position stored in the motion information database 8. That is, the control flag of the motion information database 8 is not changed. If the control flag is changed, in order that control can be performed on the basis of the position and the force again, data before changing the flag may be stored in the motion information database 8. In this case, at the time when the control flag in the motion information database before being changed when the care-receiver 7 or the caregiver 18 releases the up button 6b or the down button 6c becomes (0, 0), that is, when control by using only the position is started, the motion information database 8 may be restored to the one before being changed.

As described above, with the robot system 1, when performing standing motion assistance, the controller 12 controls the motion of the arm mechanism 4 so as to control the motion of the connector 4g in the z-axis direction and the motion of the connector 4g in the x-axis direction. If the position of the connector 4g in the z-axis direction deviates from the target position on the path in the motion information due to, for example, a force applied to the arm mechanism 4, the controller 12 performs control so that the connector 4g performs a motion in the x-axis direction on the basis of the motion information. However, the controller 12 performs control so that the connector 4g moves in the z-axis direction to a position that is different from the position indicated by the motion information to prevent the connector 4g from deviating from the path and to cause the connector 4g to keep on the path.

For example, the controller 12 controls the motion of the connector 4g in the x-axis direction so that, for example, the connector 4g moves toward a position in front of the care-receiver 7 at a constant velocity along the path along which the connector 4g reaches a predetermined position at a predetermined time. Moreover, the controller 12 controls the motion of the connector 4g in the z-axis direction so that the connector 4g moves along a path along which the connector 4g reaches a predetermined position at a predetermined time. However, if the position of the connector 4g in the z-axis direction is about to deviate from the path (the original path) to another path due to a force that the care-receiver 7 applies to the arm mechanism 4, the controller 12 performs control so that the position of the connection mechanism 4g in the z-axis direction returns to the original path. That is, when a force is applied to the arm mechanism 4, the controller 12 performs motion control so as to change the position of the connector 4g in the z-axis direction by changing the velocity of the connector 4g in the z-axis direction and to prevent the path from being changed to another path due to a displacement in the z-axis direction.

Next, when the care-receiver 7 has finished standing up from the seat 5, such as a bed, the care-receiver 7 or the caregiver 18 releases the brakes by pressing the brake ON/OFF button 6d of the input interface 6 in the state shown in FIG. 9E. Then, when the care-receiver 7 applies a force in the forward direction (for example, the leftward direction in FIG. 9E), the wheels 14a and 14b of the walking mechanism 14 rotate, and the robot system 1 can function as a walker to assist the care-receiver 7 in walking.

Next, the robot system 1 assists the care-receiver 7 in performing a sitting motion of sitting on the seat 5, such as a toilet seat. After moving the walking mechanism 14 to a position in front of the seat 5, the care-receiver 7 or the caregiver 18 presses the brake ON/OFF button 6d of the input interface 6 to apply the brakes to the wheels 14a and 14b of the walking mechanism 14.

Figure 10A:
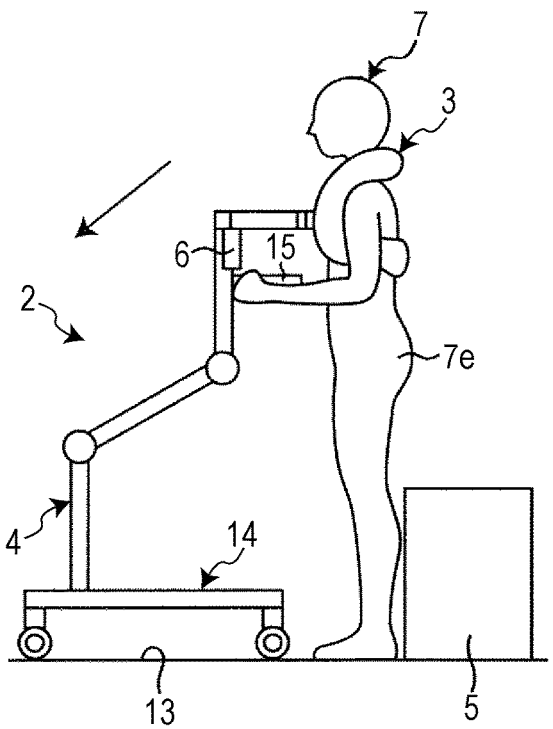
FIG. 10A illustrates a sitting motion of the robot system according to the first embodiment of the present disclosure.

Referring to FIG. 10A, the care-receiver 7 starts a sitting motion from a position in which the care-receiver 7 stands in front of the seat 5. When the care-receiver 7 or the caregiver 18 presses the down button 6c of the input interface 6, the arm mechanism 4 starts a sitting motion. When the care-receiver 7 or the caregiver 18 releases the down button 6c, the arm mechanism 4 stops at the position. If the care-receiver 7 sits quickly and the buttocks 7e of the care-receiver 7 hit the seat 5, the buttocks 7e or the like may fracture. To prevent such an accident, the robot system 1 assists the care-receiver 7 so that the care-receiver 7 can take a sitting position without falling. Moreover, to adjust the sitting position on the seat 5, the motion of the arm mechanism 4 can be stopped at the position at which the care-receiver 7 or the caregiver 18 releases the down button 6c of the input interface 6.

Figure 10B:
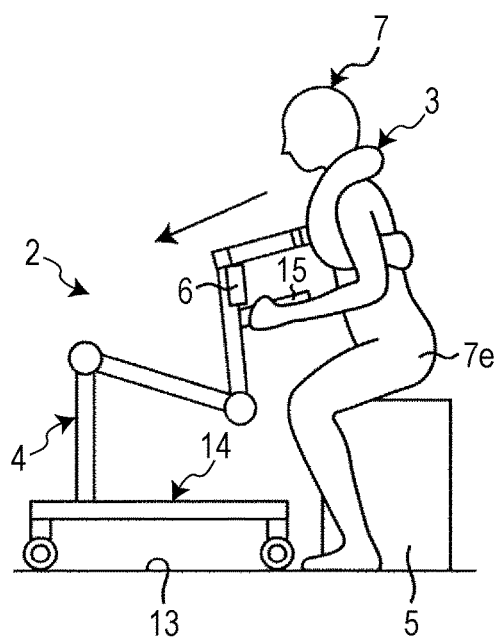
FIG. 10B illustrates a sitting motion of the robot system according to the first embodiment of the present disclosure.
Figure 10C:
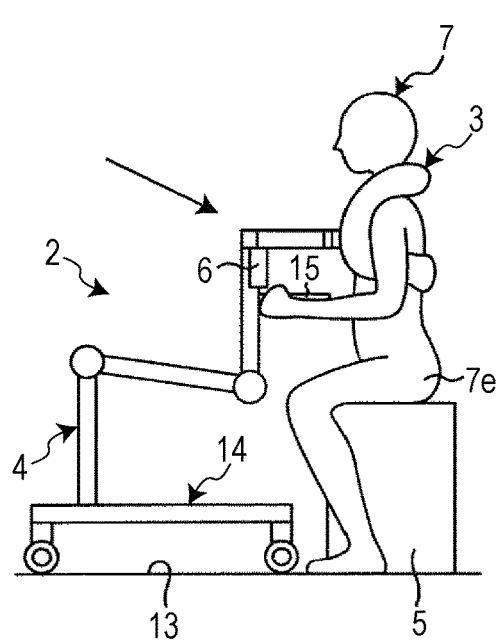
FIG. 10C illustrates a sitting motion of the robot system according to the first embodiment of the present disclosure.

To be specific, referring to FIG. 10A, when the care-receiver 7 or the caregiver 18 presses the down button 6c of the input interface 6, the motion information generator 10 generates motion information successively from the position at the time when the progress information in the motion information database 8 is "1" upward in the table of FIG. 6. In order that the care-receiver 7 can stably take a sitting position without falling, the motion information generator 10 generates the motion information by using only position information and without using force information. Accordingly, after the care-receiver 7 or the caregiver 18 presses the down button 6c, in order to perform control by using only the position information, the motion information generator 10 changes all control flags to (0, 0). For example, by generating the motion information downward from the standing position P2 in FIG. 7C, the motion information generator 10 generates motion information along the path shown in FIG. 7C. Then, the care-receiver 7 moves diagonally downward in the forward direction as illustrated in FIGS. 10A and 10B. When the care-receiver 7 has sit on the seat 5 as illustrated in FIG. 10C, the care-receiver 7 or the caregiver 18 releases the down button 6c of the input interface 6. As in the case of the standing motion, the motion information generator 10 changes the "PROGRESS INFORMATION" at the time when the motion is stopped is to "1".

The care-receiver 7 or the caregiver 18 can press or release the up button 6b or the down button 6c of the input interface 6 when the care-receiver 7 is at any position. For example, when the care-receiver 7 starts a sitting motion to sit on a toilet seat from the position shown in FIG. 10A, the care-receiver 7 or the caregiver 18 can stop the arm mechanism 4 by releasing the down button 6c of the input interface 6 at the time of FIG. 10B. Therefore, for example, the care-receiver 7 can pull down underwear in a state in which the buttocks 7e of the care-receiver 7 are above the toilet seat. Then, the care-receiver 7 or the caregiver 18 may press the down button 6c again so that the care-receiver 7 can sit on the toilet seat, which is an example of seat 5. Moreover, when performing a standing motion, if the care-receiver 7 wants to slightly adjust the height of the standing position after temporarily stopping the standing motion, the care-receiver 7 or the caregiver 18 can adjust the height by pressing the up button 6b or the down button 6c. However, if the control flag of the motion information at the time when the care-receiver 7 or the caregiver 18 presses the up button 6b includes "1", that is, in the case of performing control on the basis of position information and force information, the motion information generator 10 generates the motion information so as to change all subsequent control flags to "0". This is because, when starting a motion, the care-receiver 7 may apply an unnecessarily large force to the arm mechanism 4 because the motion tends become instable at the start. By causing the motion information generator 10 to generate the motion information only by using the position information to control a motion stably, it is possible to reduce the instability of the motion of the care-receiver 7 at the start of the motion.

The value of a force detected by the force detector 17 may be displayed, for example, on a monitor (not shown) attached to the arm mechanism 4, so that the care-receiver 7 or the caregiver 18 can check the force applied to the arm mechanism 4. In this case, when a larger force is applied to the arm mechanism 4, it is implied that the care-receiver 7 has a smaller power in, for example, the lower body. Therefore, for example, the care-receiver 7 can check the progress of rehabilitation. Moreover, by comparing the value of the force with past values stored in the robot system 1, the care-receiver 7 can check the cumulative effect of rehabilitation.

In the example described above, the motion information generator 10 changes the motion information so that the connector 4g can keep on the predetermined path when the velocity is changed. Alternatively, the motion information generator 10 may change the motion information so that the difference between the previous path and the changed path falls within a predetermined range.

Controller 12

The controller 12 controls the arm mechanism 4 on the basis of instructions that are input through the input interface 6. In addition, the controller 12 controls the brakes 14c and 14d on the basis of instructions for putting on/off the brakes 14c and 14d, which are input through the input interface 6.

Hereinafter, motions of the robot system 1, which are controlled by the controller 12 on the basis of the motion information generated by the motion information generator 10, will be described.

Referring to the flowcharts shown in FIGS. 11A to 11F, the motions of the arm mechanism 4 of the robot system 1 and corresponding motions of the caregiver 18 and the care-receiver 7, which are illustrated in FIGS. 8A to 8D, 9A to 9E, and 10A to 10C, will be described.

First, referring to FIG. 8A, the care-receiver 7 sits on the seat 5, such as a bed, placed on the floor 13. The caregiver 18 moves the robot system 1, whose arm mechanism 4 is folded for storage, to a position in front of the care-receiver 7.

Referring to FIG. 11A, the robot system 1 successively performs an initializing motion S-A, a standing motion S-B, a walking motion S-C, a sitting motion S-D, and a finishing motion S-E.

Referring to FIG. 11B, the initialization motion S-A includes steps S101 to S104.

In step S101, the caregiver 18 or the care-receiver 7 presses the power ON/OFF button 6a of the input interface 6 of the robot 20 to turn on the robot system 1.

In step S102, the caregiver 18 or the care-receiver 7 presses the brake ON/OFF button 6d of the input interface 6 of the robot 20 to apply the brakes.

In step S103, the caregiver 18 or the care-receiver 7 presses the initial position button 6e of the input interface 6 of the robot 20 to move the robot system 1 to the initial position. To be specific, the controller 12 controls the motion of the arm mechanism 4 so that the arm mechanism 4 moves from a state in which the arm mechanism 4 is folded for storage as illustrated in FIG. 8A to the initial position of the arm mechanism 4 as illustrated in FIG. 8B. The controller 12 obtains, through the database I/O unit 9, the coordinates of the initial position from the position information in the motion information database 8 at the time when the initial position flag is "1". The controller 12 controls the first motor 41 and the second motor 42 independently so that the arm mechanism 4 moves to the initial position.

In step S104, if the height of the connector 3c of the care belt 3 put on the care-receiver 7 does not match the height of the connector 4g of the arm mechanism 4, the caregiver 18 or the care-receiver 7 adjusts the height of the connector 4g. To be specific, the caregiver 18 or the care-receiver 7 adjusts the height by pressing the up button 6b or the down button 6c of the input interface 6. FIG. 7C is a graph in which the position information in the motion information database is plotted on a surface having the x-axis (horizontal axis) and the z-axis (vertical axis). The initial position is P0 in FIG. 7C. When the care-receiver 7 or the caregiver 18 presses the up button 6b, the position of the connector 4g moves upward along the path shown in FIG. 7C. When the care-receiver 7 or the caregiver 18 presses the down button 6c, the position of the connector 4g moves downward along the path shown in FIG. 7C. Thus, the height of the connector 4g can be adjusted. The control is performed only when the up button 6b or the down button 6c is pressed and is stopped when the up button 6b or the down button 6c is released. FIG. 8C shows a state in which the height of the connector 4g has been adjusted.

Thus, the initialization motion S-A is finished.

As necessary, the care-receiver 7 or the caregiver 18 may release the brakes by releasing the brake ON/OFF button 6d of the input interface 6 of the robot 20 to move the robot system 1 closer to the care-receiver 7 and may press the brake ON/OFF button 6d of the input interface 6 again to apply the brakes again.

Referring to FIG. 8D, the connector 3c of the care belt 3 and the connector 4g of the arm mechanism 4 are connected to each other, and the care-receiver 7 grips the handle 15 with both hands.

Referring to FIG. 11 C, the standing motion S-B, which is performed second, includes steps S105 to S109.

In step S105, the caregiver 18 or the care-receiver 7 presses the up button 6b of the input interface 6 to cause the arm mechanism 4 of the robot system 1 to start assisting the care-receiver 7 in performing a standing motion. In this example, the arm mechanism 4 moves only when the care-receiver 7 or the caregiver 18 is pressing the up button 6b, and the arm mechanism 4 stops moving when the care-receiver 7 or the caregiver 18 releases the up button 6b. For example, from the time when the care-receiver 7 is in a sitting position shown in FIG. 3A to the time when the buttocks 7e of the care-receiver 7 leave the seat 5 as shown in FIG. 3B, the arm mechanism 4 is controlled on the basis of the position information stored in in the motion information database 8 both for the x-axis and the z-axis. When the care-receiver 7 stands up as illustrated in FIGS. 3B and 3C, in step S106, the motion information generator 10 generates the motion information on the basis of the force information detected by the force detector 17 and the position information of the arm mechanism 4 and stores the motion information in the motion information database 8 via the database I/O unit 9 (step S107).

In step S108, the controller 12 obtains the motion information from the database I/O unit 9, and the controller 12 performs control so as to drive the first motor 41 and the second motor 42 independently so that the arm mechanism 4 moves in accordance with the motion information obtained from the database I/O unit 9.

In step S109, when the caregiver 18 in the standing position or the care-receiver 7 releases the up button 6b of the input interface 6, the arm mechanism 4 stops the standing motion.

Thus, the standing motion S-B is finished.

Referring to FIG. 11D, the walking motion S-C, which is performed third, includes steps S110 and S111.

In step S110, when the care-receiver 7 or the caregiver 18 releases the brake ON/OFF button 6d of the input interface 6 to release the brakes and the care-receiver 7 applies a force in the forward direction (for example, the leftward direction in FIG. 9E), the wheels 14a and 14b of the walking mechanism 14 rotate and the robot system 1 functions as a walker to assist the care-receiver 7 in walking.

Next, when the care-receiver 7 reaches a position in front of the seat 5, such as a toilet seat, in step S111, the care-receiver 7 or the caregiver 18 presses the brake ON/OFF button 6d of the input interface 6 to apply the brakes.

Thus, the walking motion S-C is finished.

Figure 11E:
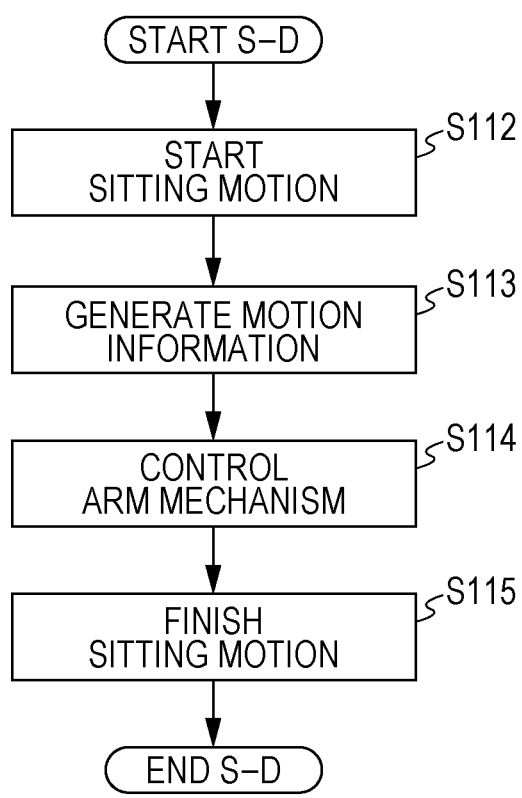
FIG. 11E is a flowchart of a sitting motion controlled by the controller according to the first embodiment of the present disclosure.
Figure 11F:
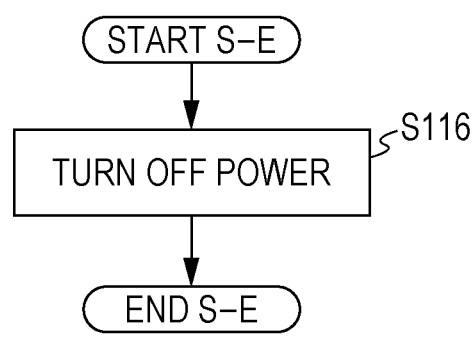
FIG. 11F is a flowchart of a finishing motion controlled by the controller according to the first embodiment of the present disclosure.

Referring to FIG. 11E, the sitting motion S-D, which is performed fourth, includes steps S112 to S115.

In step S112, the care-receiver 7 starts a sitting motion to sit on a toilet seat or the like and the arm mechanism 4 starts a sitting motion. When the care-receiver 7 or the caregiver 18 presses the down button 6c of the input interface 6, the arm mechanism 4 starts the sitting motion. When the care-receiver 7 or the caregiver 18 releases the down button 6c of the input interface 6, the arm mechanism 4 stops moving at the position.

In step S113, after the care-receiver 7 or the caregiver 18 has pressed the down button 6c, in order to perform control by using only the position information, the motion information generator 10 generates the motion information so as to change all control flags to (0, 0) and stores the motion information in the motion information database 8.

In step S114, the controller 12 obtains the motion information from the motion information database 8 via the database I/O unit 9, and the controller 12 drives the arm mechanism 4 so that the arm mechanism 4 moves in accordance with the motion information obtained from the database I/O unit 9.

When the care-receiver 7 or the caregiver 18 releases the down button 6c, the arm mechanism 4 finishes the sitting motion (step S115).

Thus, the sitting motion S-D is finished.

Referring to FIG. 11 F, the termination motion S-E, which is performed fifth, includes step S116.

To finish using the robot 20, the care-receiver 7 or the caregiver 18 disconnects the connector 3c of the care belt 3 from the connector 4g of the arm mechanism 4 and turns off the power (step S116).

Thus, the termination motion S-E is finished.

Advantages of First Embodiment

With the standing/sitting motion assist system, the control device 11 controls the motion of the arm mechanism 4 so that the care belt 3 moves along the predetermined path KO by changing the third position p21 to the position p23 on the predetermined path KO at the time t12, which is after the third time t11, on the basis of the third position p21 detected by the position sensor (for example, the first encoder 43 and the second encoder 44) and the first force detected by the force detector 17. As a result, when assisting the care-receiver 7 in performing a standing motion from a sitting position or when assisting the care-receiver 7 in performing a sitting motion from a standing position, the arm mechanism 4 does not perform a motion unintended by the care-receiver 7, and the care-receiver 7 is prevented from feeling an unpleasant sensation.

The standing/sitting motion assist system, which includes the force detector 17 and the motion information generator 10, can assist the care-receiver 7 only as needed while measuring the remaining ability of the care-receiver 7 in real time. Therefore, it is possible to prevent a decrease of the muscular strength of the legs of the care-receiver 7. Moreover, the standing/sitting motion assist system has an operation interface with which the arm mechanism 4 moves only when the care-receiver 7 or the caregiver 18 presses the up button 6b or the down button 6c of the input interface 6 and the arm mechanism 4 stops when the care-receiver 7 or the caregiver 18 releases the up button 6b or the down button 6c. Therefore, the assist system is safe and allows the height of the arm mechanism to be adjusted in accordance with the height of the care-receiver 7 or the height of the seat 5, such as a bed.

Modification of First Embodiment

When the care-receiver 7 receives standing motion assistance, depending on the direction of the arm mechanism 4, it may be difficult for the care-receiver 7 to smoothly stand up even though the care-receiver 7 is assisted by the arm mechanism 4.

Figure 14:
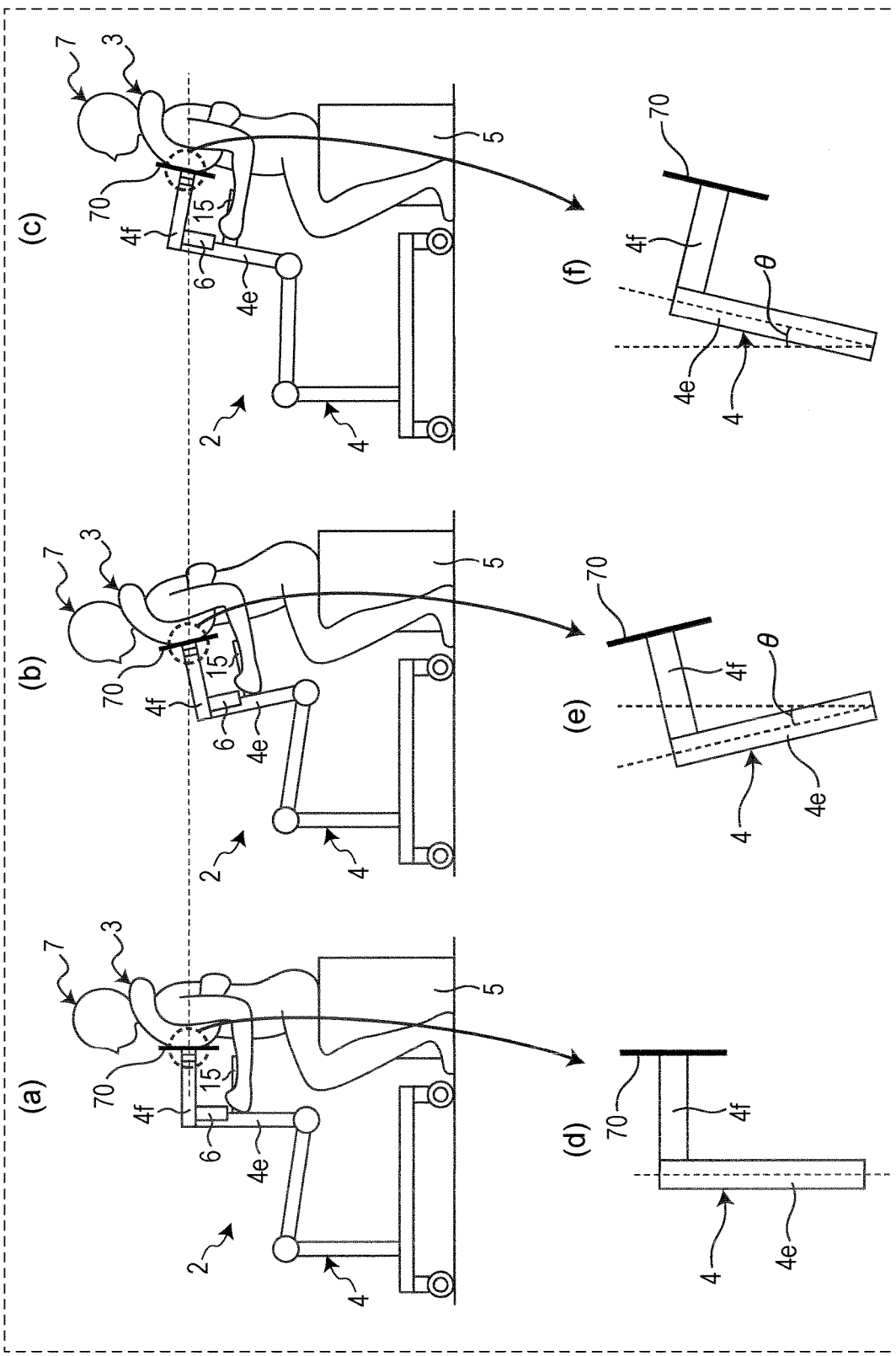
FIG. 14 illustrates the relationship between a care-receiver and the position of an arm mechanism according to a modification of the first embodiment of the present disclosure.

In all of parts (a) to (c) of FIG. 14, as shown by a horizontal broken line, the height of the connector 4g of the arm mechanism 4 and the connector 3c of the care belt 3, which is connected to the connector 4g, is the same. However, the direction of the arm mechanism 4 differs among parts (a), (b), and (c) of FIG. 14. Parts (d) to (f) of FIG. 14, which are enlarged views respectively corresponding to parts (a) to (c) of FIG. 14, illustrate the angles of a plane 70 that is perpendicular to the axial direction of the fourth arm 4f, which is located at an end of the arm mechanism 4 adjacent to the care-receiver 7. The inclination angle θ of the plane 70 is the same as the angle θ between the third arm 4e, which is perpendicularly connected to the fourth arm 4f, and the vertical direction. Therefore, it is possible to detect the inclination angle θ of the plane 70 by measuring the inclination angle of the third arm 4e.

Parts (a) and (d) of FIG. 14 illustrate a case where the plane 70, which is perpendicular to the axial direction of the fourth arm 4f of the arm mechanism 4, extends vertically. Parts (b) and (e) of FIG. 14 illustrate a case where the plane 70, which is perpendicular to the axial direction of the fourth arm 4f of the arm mechanism 4, is inclined forward. In either of these cases, when the care-receiver 7 receives standing motion assistance from the arm mechanism 4, as described above with reference to FIGS. 3A to 3C, the upper body of the care-receiver 7 becomes inclined forward, and the care-receiver 7 can stand up smoothly while bending forward.

In contrast, parts (c) and (f) of FIG. 14 illustrate a case where the plane 70, which is perpendicular to the axial direction of the fourth arm 4f, is inclined backward. In this case, when the care-receiver 7 receives standing motion assistance from the arm mechanism 4, the upper body of the care-receiver 7 becomes inclined backward, and the care-receiver 7 is lifted upward in a state in which the care-receiver 7 is bent backward. When the care-receiver 7 stands up while the upper body is bent backward in this way, which differs from the way in which an able-bodied person stands up, it is very difficult for the care-receiver 7 to stand up.

Therefore, the robot system 1 may be configured as follows. When assisting the care-receiver 7 in performing a standing motion at the aforementioned initial position or at a position at which the height has been adjustment at the initial position, the robot system 1 may detect whether the arm mechanism 4 is in a state in which the plane 70 at the end of the arm mechanism 4 adjacent to the connector 4g is vertical as shown in parts (a) and (d) or in a state in which the plane 70 is inclined forward as shown in FIG. 14 and parts (b) and (e) of FIG. 14. Only if it is detected that the plane 70 in either of these states, the arm mechanism 4 is allowed to perform standing motion assistance. For example, the connector 4g may include a detector, such as a force sensor, for detecting the inclination angle of the plane 70, and information detected by the detector may be input to the controller 12 through the input interface 6. The controller 12 may allow the arm mechanism 4 to perform standing motion assistance only when it is detected that the arm mechanism 4 is in either of the aforementioned states.

Assuming that the clockwise direction in parts (e) and (f) of FIG. 14 is the positive direction of the inclination angle θ, it is defined, for example, that an appropriate vertical or forwardly inclined state is a state in which the inclination angle θ is in the range of 0 to −30 degrees. By this definition, in a backwardly bent state, for example, the angle θ>0. Thus, if the angle θ detected by the sensor is in the range of 0 to −30 degrees, it can be determined that the plane 70 is in an appropriate vertical or forwardly inclined state (forwardly inclined state or the like), and the controller 12 can perform control so that the arm mechanism 4 performs standing motion assistance. If the angle θ detected by the sensor is not in this range, the controller 12 can perform control so that the arm mechanism 4 stops without performing standing motion assistance.

For example, the sensor may detect the angle θ for a predetermined time (for example, about 4 seconds) after the arm mechanism 4 is located at the initial position or at a position at which the height is adjusted, and the state of the plane 70 may be determined on the basis of the angle θ detected in the predetermined time.

If the controller 12 can determine whether or not a connection operation is being performed on the basis of information that is input from a switch to the controller 12 through the input interface 6 or information of an image captured by a camera, the angle θ may be detected as soon as the connection operation is finished.

Figure 15:
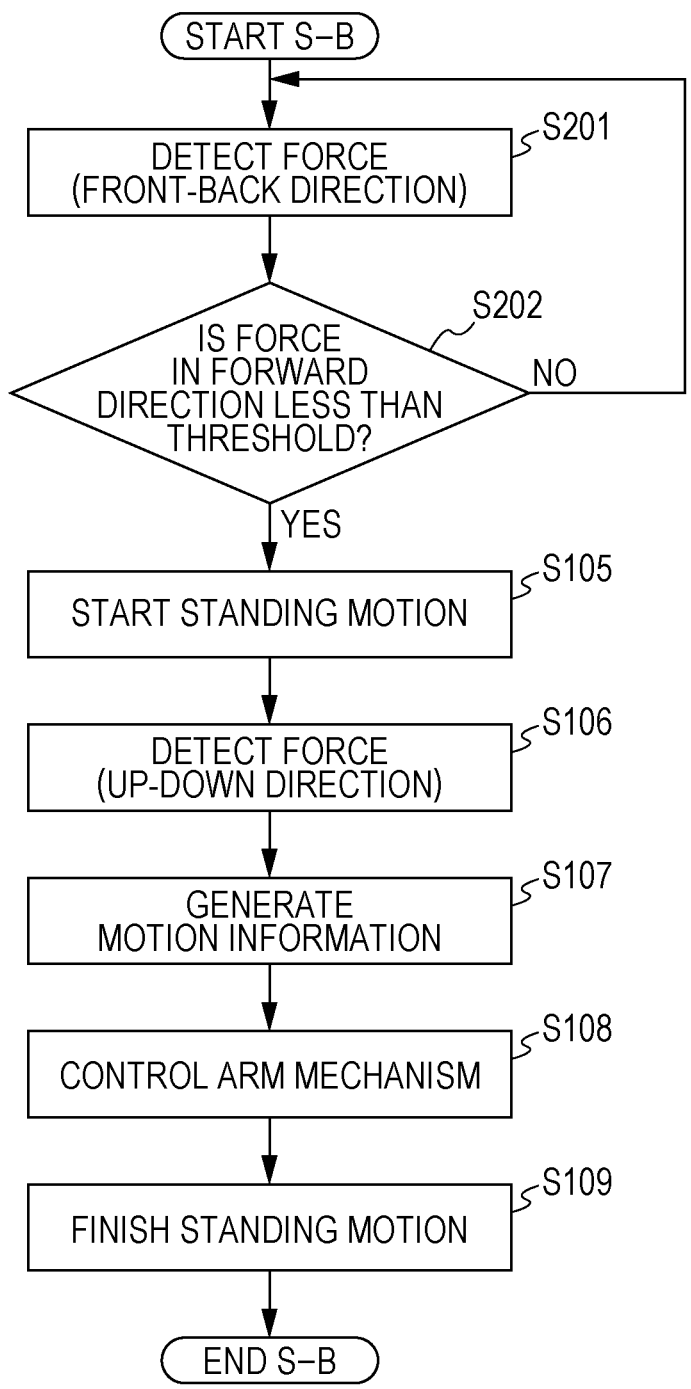
FIG. 15 is a flowchart of a standing motion controlled by the controller according to a modification of the first embodiment of the present disclosure.

Instead of detecting the angle θ, a force in the forward direction may be detected by using the force detector 17 described above, which is a force sensor, and, if the force in the forward direction (having a negative sign) is less than a threshold, the controller 12 may determine that the magnitude (absolute value) of the force in the forward direction is greater than a predetermined value and the plane 70 is in a forwardly inclined state and may perform motion control so as to allow the arm mechanism 4 to continue standing motion assistance. FIG. 15 shows a timing with which the controller 12 determines whether the plane 70 is in a forwardly inclined state or the like in the standing motion S-B. Before performing step S105 of the standing motion S-B, which is shown in FIG. 11C, detection of a force (in the forward or backward direction) in step S201 and determination of whether or not the force in the forward direction is less than a threshold in step S202 are performed.

In step S201, the force detector 17 detects a force in the forward or backward direction. Here, it is defined that a force in the forward direction has a negative sign and a force in the backward direction has a positive sign.

In step S202, if the force detected by the force detector 17 is less than a threshold (for example, −10N), the controller 12 determines that the magnitude (absolute value) of the force in the forward direction is greater than a predetermined value and the plane 70 is in a forwardly inclined state and the controller 12 performs motion control so as to continue standing motion assistance in steps S105 to S109. If the force detected by the force detector 17 is not less than the threshold, the process returns to step S201. If the process loops through steps S201 and S202 for a predetermined time, the process is stopped.

If it is determined that the plane 70 is not in a forwardly inclined state or the like by detecting the angle θ or by detecting a force with the force detector 17, the robot system 1 may make an output (display or sound) indicating that the plane 70 is not in a forwardly inclined state or the like or an output (display or sound) that prompts the care-receiver 7 to cause the plane 70 to be in a forwardly inclined state, or may give a warning or an alarm.

Accordingly, the robot system according to the present modification further includes a force sensor for determining whether to start a pulling motion, the force sensor measuring a force in the forward direction that is applied to the traction mechanism through the holding mechanism before the traction mechanism starts pulling the holding mechanism, and the traction mechanism starts a pulling motion only if the force detected by the force sensor is greater than a threshold. As described above, the force detector 17 may be used also as the force sensor for determining whether to start the pulling motion. Alternatively, the force sensor may be a sensor that is independent from the force detector 17 and that is disposed in the traction mechanism (such as in the connector 4g).

With this structure, the robot system 1 can assist the care-receiver 7 in performing a standing motion more safely and smoothly.

In the first embodiment, the robot system 1 includes the walking mechanism 14 including the arm mechanism 4. However, the arm mechanism 4 may be included in the seat 5, which may be a bed side rail, a toilet seat, or a wheelchair.

In the first embodiment, the traction mechanism is, for example, the arm mechanism 4. However, this is not a limitation. The traction mechanism may be any mechanism that can apply an external force to the care belt 3 so as to assist the care-receiver 7 in performing a standing motion.

In each embodiment, any part of the control device 11 may be implemented in software. For example, the control device 11 may be a computer-readable recording medium (such as a hard disk) storing a computer program including steps in each embodiment described in the present specification, and the steps may be performed by reading the computer program into a temporary storage device (such as a semiconductor memory) of a computer and executing the computer program by using a CPU.

To be more specific, a part or the entirety of the controller may be a computer system including various devices, such as a microprocessor, a ROM, a RAM, a hard disk unit, a display unit, a keyboard, and a mouse. The RAM or the hard disk unit stores a computer program. The microprocessor executes the computer program to cause the devices to perform their functions. The computer program includes a plurality of instruction codes for causing the computer to perform a predetermined function.

For example, a program processor, such as a CPU, reads a software program stored in a recording medium, such as a hard disk or semiconductor memory, and executes the software program, thereby realizing the elements. The software that realizes some or all of the elements of the controller in the embodiments or the modifications described above is as follows.

A program that is executed by a computer of a robot for assisting a care-receiver in performing a standing motion and a sitting motion, the robot including a holding mechanism that holds a care-receiver, a traction mechanism that is connected to the holding mechanism and that pulls the holding mechanism so that the holding mechanism draws a path that is convexly curved in a forward direction from the care-receiver by causing the holding mechanism to pass a first position at a first time and a second position at a second time, a position sensor that measures a third position of the holding mechanism at a third time between the first time and the second time, and a force sensor that measures a first force that is applied to the traction mechanism via the holding mechanism at the third time, the program causing the computer to execute obtaining the third position of the holding mechanism at the third time by using the position sensor, obtaining the first force at the third time by using the force sensor, and controlling, by using a controller, the traction mechanism so that the holding mechanism draws the path by changing the third position to a position on the path at a time after the third time on the basis of the obtained third position and the obtained first force.

This program may be downloaded from a server or the like and executed or may be read from a predetermined record medium (for example, an optical disk such as a CD-ROM, a magnetic disk, or a semiconductor memory) and executed.

The program may be executed by a single computer or a plurality of computers. That is, integrated processing may be performed or distributed processing may be performed.

Moreover, any of the embodiments and modifications described may be used in combination to obtain advantages of the embodiments and modifications.

Combinations of the embodiments, combinations of examples, or combinations of the embodiments and the examples may be used. Combination of features of different embodiments or examples may be used.

A standing/sitting motion assist system, a standing/sitting motion assist method, a standing/sitting motion assist robot, and a standing/sitting motion assist program according to the present disclosure can assist the care-receiver in performing a standing motion, a sitting motion, or walking while prevent a traction mechanism from performing a motion that is not intended by a care-receiver and prevent the care-receiver from feeling an unpleasant sensation.

What is claimed is:

1. A robot system comprising:

a holding mechanism that holds a user;

a traction mechanism that is connected to the holding mechanism and that pulls the holding mechanism so that a position of the holding mechanism draws a predetermined path;

a position sensor that measures the position of the holding mechanism on the predetermined path;

a force sensor that measures a first force that is applied to the traction mechanism when the position of the holding mechanism is measured by the position sensor; and a controller that (a) estimates the position of the holding mechanism after a predetermined time on the basis of the first force and the position of the holding mechanism measured by the position sensor and, (b) if the estimated position of the holding mechanism is not on the predetermined path, controls a motion of the traction mechanism so that the position of the holding mechanism after the predetermined time lies on the predetermined path on the basis of the first force and the position of the holding mechanism.

2. The robot system according to claim 1,
wherein the position sensor measures the position of the holding mechanism at the present time, and
wherein the controller (a) estimates the position of the holding mechanism after the predetermined time from the present time on the basis of the first force and the position of the holding mechanism measured by the position sensor.

3. The robot system according to claim 1,
wherein the controller (b) changes a velocity with which the traction mechanism pulls the holding mechanism so that the position of the holding mechanism after the predetermined time lies on the predetermined path.

4. The robot system according to claim 1,
wherein the predetermined path is a path that is convexly curved in a forward direction from the user and that includes a first position and a second position, and
wherein the first position is below the second position.

5. The robot system according to claim 4,
wherein the controller (b) changes only a velocity in a height direction with which the traction mechanism pulls the holding mechanism so that the position of the holding mechanism after the predetermined time lies on the predetermined path.

6. The robot system according to claim 1,
wherein the controller controls the motion of the traction mechanism on the basis of a predetermined motion information database that stores motion information of the traction mechanism, the motion information including correspondence among a time, the position of the holding mechanism, a velocity of the holding mechanism in a horizontal direction, and a velocity of the holding mechanism in a height direction, and
wherein the controller
(b1) calculates a position of the holding mechanism in the height direction after the predetermined time on the basis of the motion information in the motion information database and the first force,
(b2) calculates a position of the holding mechanism in the horizontal direction on the predetermined path corresponding to the position of the holding mechanism in the height direction after the predetermined time,
(b3) calculates a velocity of the holding mechanism in the horizontal direction that is used to locate the traction mechanism at the calculated position of the holding mechanism in the horizontal direction after the predetermined time, and
(b4) moves the traction mechanism by using the calculated velocity of the holding mechanism in the horizontal direction instead of using the velocity of the holding mechanism in the horizontal direction that is stored in the motion information database.

7. The robot system according to claim 1, further comprising:
an operation device that receives an operation input to the traction mechanism,
wherein the controller controls the motion of the traction mechanism so that the position of the holding mechanism draws the predetermined path while the operation device continues receiving the operation input.

8. The robot system according to claim 4,
wherein the controller controls the motion of the traction mechanism so that a velocity with which the traction mechanism pulls the holding mechanism from the first position to a predetermined position on the predetermined path is less than a velocity with which the traction mechanism pulls the holding mechanism from the predetermined position to the second position.

9. The robot system according to claim 1,
wherein the predetermined path is a path along which the user stands up and the user sits down.

10. The robot system according to claim 1,
wherein the traction mechanism includes an arm mechanism and a plurality of wheels, the arm mechanism including a plurality of joints, the wheels being disposed on a lower part of the arm mechanism.

11. A holding mechanism for holding a user of a robot system including
a traction mechanism that is connected to the holding mechanism and that pulls the holding mechanism so that a position of the holding mechanism draws a predetermined path;
a position sensor that measures the position of the holding mechanism on the predetermined path;
a force sensor that measures a first force that is applied to the traction mechanism when the position of the holding mechanism is measured by the position sensor; and
a controller that estimates the position of the holding mechanism after a predetermined time on the basis of the position of the holding mechanism and the first force and, (b) if the estimated position of the holding mechanism is not on the predetermined path, controls a motion of the traction mechanism so that the position of the holding mechanism after the predetermined time lies on the predetermined path on the basis of the first force and the position of the holding mechanism,
the holding mechanism comprising:
a first holder that holds a neck or a back of the user;
a second holder that holds a waist of the user; and
a connector that is placed on a chest of the user and that connects the first holder and the second holder to each other on a front side of the user,
wherein the holding mechanism is attachable to and removable from the traction mechanism via the connector.

12. A non-transitory computer-readable recording medium storing a program that is executed by a computer of a robot system including
a holding mechanism that holds a user,
a traction mechanism that is connected to the holding mechanism and that pulls the holding mechanism so that a position of the holding mechanism draws a predetermined path,
a position sensor that measures the position of the holding mechanism on the predetermined path, and
a force sensor that measures a first force that is applied to the traction mechanism when the position of the holding mechanism is measured by the position sensor,
the program causing the computer to execute:
(a) estimating the position of the holding mechanism after a predetermined time on the basis of the first force and the position of the holding mechanism measured by the position sensor; and, (b) if the estimated position of the holding mechanism is not on the predetermined path, controlling a motion of the traction mechanism so that the position of the holding mechanism after the predetermined time lies on the predetermined path on the basis of the first force and the position of the holding mechanism.

13. The non-transitory computer-readable recording medium storing the program according to claim 12,
   wherein the position sensor measures the position of the holding mechanism at the present time, and
   wherein, in the step (a), the position of the holding mechanism after the predetermined time from the present time is estimated on the basis of the first force and the position of the holding mechanism measured by the position sensor.

14. The non-transitory computer-readable recording medium according to claim 12,
   wherein, in the step (b), a velocity with which the traction mechanism pulls the holding mechanism is changed so that the position of the holding mechanism after the predetermined time lies on the predetermined path.

15. A method of controlling a robot system including
   a holding mechanism that holds a user,
   a traction mechanism that is connected to the holding mechanism and that pulls the holding mechanism so that a position of the holding mechanism draws a predetermined path,
   a position sensor that measures the position of the holding mechanism on the predetermined path, and
   a force sensor that measures a first force that is applied to the traction mechanism when the position of the holding mechanism is measured by the position sensor,
   the method comprising:
   (a) estimating the position of the holding mechanism after a predetermined time on the basis of the first force and the position of the holding mechanism measured by the position sensor; and,
   (b) if the estimated position of the holding mechanism is not on the predetermined path, controlling a motion of the traction mechanism so that the position of the holding mechanism after the predetermined time lies on the predetermined path on the basis of the first force and the position of the holding mechanism.

* * * * *